(12) United States Patent
 Jo

(10) Patent No.: US 11,788,589 B2
(45) Date of Patent: *Oct. 17, 2023

(54) DRUM BRAKE APPARATUS

(71) Applicant: HYUNDAI MOBIS CO., LTD., Seoul (KR)

(72) Inventor: Chi Hoon Jo, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 251 days.

This patent is subject to a terminal disclaimer.

(21) Appl. No.: 17/169,500

(22) Filed: Feb. 7, 2021

(65) Prior Publication Data

US 2021/0254678 A1 Aug. 19, 2021

(30) Foreign Application Priority Data

Feb. 17, 2020 (KR) .................. 10-2020-0019244
Mar. 30, 2020 (KR) .................. 10-2020-0038228

(51) Int. Cl.
 *F16D 51/24* (2006.01)
 *F16D 65/08* (2006.01)
 (Continued)

(52) U.S. Cl.
 CPC ............ *F16D 51/24* (2013.01); *F16D 65/08* (2013.01); *F16D 65/22* (2013.01); *F16D 65/58* (2013.01); *F16D 2121/04* (2013.01); *F16D 2125/08* (2013.01); *F16D 2125/52* (2013.01); *F16D 2125/70* (2013.01)

(58) Field of Classification Search
 CPC .......... F16D 51/25; F16D 65/08; F16D 65/22; F16D 65/58; F16D 2121/04; F16D 2125/08; F16D 2125/52; F16D 2125/70; F16D 51/24
 See application file for complete search history.

(56) References Cited

U.S. PATENT DOCUMENTS 2,018,845 A * 10/1935 Folberth ............... F16D 65/561
 188/79.62
3,047,099 A * 7/1962 Dahle .................... F16D 51/18
 188/196 A
(Continued)

FOREIGN PATENT DOCUMENTS

EP        0989322 A2 * 3/2000
KR   10-2018-0047519      5/2018
WO   WO-2015199237 A1 * 12/2015 ............ B60T 13/588

*Primary Examiner* — Xuan Lan Nguyen
(74) *Attorney, Agent, or Firm* — H.C. Park & Associates, PLC

(57) ABSTRACT

A drum brake apparatus includes: a housing; a main braking part installed on one side of the housing, and driven by hydraulic pressure so as to press a shoe during main braking; and a parking braking part installed on another side of the housing, and driven by an electromotive force of an actuator so as to press the shoe during parking braking. The housing includes: a housing part; a piston housing part formed on the housing part, having a hollow portion formed therein, and having the main braking part installed therein; and a rod housing part formed on the housing part, having a hollow portion formed therein, and having the parking braking part installed therein. The rod housing part is disposed at a location farther from a rotation center of the shoe than the piston housing part.

8 Claims, 16 Drawing Sheets

(51) Int. Cl.
*F16D 65/22* (2006.01)
*F16D 65/58* (2006.01)
F16D 121/04 (2012.01)
F16D 125/08 (2012.01)
F16D 125/52 (2012.01)
F16D 125/70 (2012.01)

(56) References Cited

U.S. PATENT DOCUMENTS

| | | | | |
|---|---|---|---|---|
| 3,324,975 | A * | 6/1967 | Cumming | F16D 65/22 |
| | | | | 188/364 |
| 3,349,875 | A * | 10/1967 | Stelzer | F16D 65/22 |
| | | | | 188/78 |
| 3,613,841 | A * | 10/1971 | Newstead | B60T 1/005 |
| | | | | 192/114 R |
| 4,615,419 | A * | 10/1986 | Gaiser | F16D 65/22 |
| | | | | 303/112 |
| 5,964,324 | A * | 10/1999 | Maehara | F16D 51/52 |
| | | | | 188/325 |
| 11,053,992 | B2 * | 7/2021 | Choi | F16D 51/24 |
| 2021/0394732 | A1 * | 12/2021 | Jo | B60T 13/588 |
| 2021/0396281 | A1 * | 12/2021 | Jo | F16D 51/22 |
| 2021/0396289 | A1 * | 12/2021 | Jo | F16D 65/22 |

* cited by examiner

SECTION A-A'

SECTION B-B'

SECTION C-C'

DRUM BRAKE APPARATUS

CROSS-REFERENCE TO RELATED APPLICATIONS

This application claims priority from and the benefit of Korean Patent Application Nos. 10-2020-0019244 and 10-2020-0038228, filed on Feb. 17, 2020 and Mar. 30, 2020, respectively, which are hereby incorporated by reference for all purposes as if set forth herein.

BACKGROUND

Field

Exemplary embodiments relate to a drum brake apparatus, and more particularly, to a drum brake apparatus which generates a braking force through friction with a drum rotated with a wheel.

Discussion of the Background

In general, a drum brake refers to a device that generates a braking force through friction with a drum rotated with a wheel. Specifically, the drum brake acquires a braking force by using hydraulic pressure (main braking), or rubbing a shoe, to which a friction member is attached, against a drum (parking braking) through a cable connected to a parking brake lever.

The drum brake according to the related art includes a drum, a pair of shoes which are disposed on a back plate so as to face the inner circumferential surface of the drum and each have a friction material attached to the outer circumference thereof, and a wheel cylinder for main braking, which receives braking hydraulic pressure and moves the shoes toward the outside. The drum brake further includes an operating lever for a parking brake, which has one end axially coupled to the shoe and the other end connected to a parking brake lever installed next to a driver seat through a cable. Thus, when a driver pulls the parking brake lever, parking braking is mechanically performed.

The related art of the present disclosure is disclosed in Korean Patent Application Laid-Open No. 2018-0047519 published on May 10, 2018 and entitled "Drum Brake for Vehicle".

In the related art, a main brake apparatus for main braking and a parking brake apparatus for parking braking are separately manufactured and installed. Since the main brake apparatus and the parking brake apparatus are separately manufactured and managed, assembly locations capable of securing a gap in consideration of interference therebetween need to be inconveniently set, adjusted and designed according to the specification. Therefore, the productivity is degraded, and the manufacturing cost is increased.

Therefore, there is a need for an apparatus capable of solving the problem.

The above information disclosed in this Background section is only for enhancement of understanding of the background of the invention and, therefore, it may contain information that does not constitute prior art.

SUMMARY

Exemplary embodiments of the present invention provide an integrated drum brake apparatus capable of performing main braking and parking braking at the same time.

In an embodiment, a drum brake apparatus may include: a housing; a main braking part installed on one side of the housing, and driven by hydraulic pressure so as to press a shoe, during main braking; and a parking braking part installed on the other side of the housing, and driven by an electromotive force of an actuator so as to press the shoe, during parking braking, wherein the housing includes: a housing part; a piston housing part formed on the housing part, having a hollow portion formed therein, and having the main braking part installed therein; and a rod housing part formed on the housing part, having a hollow portion formed therein, having the parking braking part installed therein, and disposed at a location farther from a rotation center of the shoe than the piston housing part.

The housing part may include: a main body part in which the piston housing part and the rod housing part are formed; a fixing part formed on the main body part, and fixed to a back plate; and a foreign matter introduction prevention part coupled to a side portion of the main body part, where an opening of the piston housing part and an opening of the rod housing part are positioned, and configured to cover the edge of the piston housing part and the edge of the rod housing part.

The fixing part may include: one or more fixing fastening parts formed on both sides of the main body part, and fixed to the back plate with the actuator by a fastening member; and a movement prevention part protruding from a location of the main body part, corresponding to the main braking part, and fitted into a through-hole formed in the back plate.

The foreign matter introduction prevention part may include: a connection part disposed between the opening of the piston housing part and the opening of the rod housing part; a piston sealing part having a ring shape corresponding to the edge of the piston housing part, formed successively with one side of the connection part, and having an inner end connected to the main braking part; and a rod sealing part having a ring shape corresponding to the edge of the rod housing part, formed successively with the other side of the connection part, and having an inner end connected to the parking braking part.

The piston housing part may include: a cylinder part formed in a circumferential shape on the housing part, having a hollow portion formed therein, and having the main braking part housed therein; and a hydraulic pressure flow path part extended from the outer surface of the housing part to the cylinder part, and configured to form a flow path for supplying fluid into the cylinder part.

The rod housing part may include: a rod cylinder part formed in a circumferential shape on the housing part, having a hollow portion formed therein, and having the parking braking part housed therein; and a driving shaft housing part disposed at a preset distance from the piston housing part, formed to communicate with the rod cylinder part, and connected to the parking braking part through an output shaft of the actuator, which is insertable into the driving shaft housing part.

The main braking part may include: one or more pistons disposed at an end of the housing, and configured to press the shoe in response to the one or more pistons being moved in a direction towards an exterior of the housing by hydraulic pressure; and an elastic member disposed in the housing, and configured to reduce an impact force applied to the piston returned to an interior of the housing.

The parking braking part may include: a gear part disposed in the housing, and rotated in connection with the actuator; and a rod part connected to the gear part, and configured to press the shoe in response to the rod part being moved in a direction towards the exterior of the housing in connection with the gear part.

The piston housing part and the rod housing part may be positioned on the same radial extension line with respect to a rotation center of the back plate, and the actuator may be positioned on the same radial extension line as a chassis which supports the central portion of the back plate, and disposed in parallel to the rotation center of the back plate.

In another embodiment, a drum brake apparatus may include: a plate part having a brake shoe rotatably mounted thereon, the brake shoe having a lining installed on an outer surface thereof, the lining being contacted with a brake drum; a housing part mounted on the plate part; a motor part mounted in the housing part, and driven when power is applied thereto; an operating part provided in the housing part, and driven by the motor part; an operating piston part provided in the housing part, and including a pair of pistons which are moved by the operating part so as to operate the brake shoe; and a gap adjusting part mounted on the operating piston part, and configured to adjust a gap between the brake drum and the lining through an interaction with any one of the pair of pistons.

The housing part may include: a body part having the motor part mounted therein; and an operating piston mounting part formed on the body part, and having the operating part, the operating piston part and the gap adjusting part mounted therein.

The piston part may include: a first piston including a first piston body inserted into one side of the housing part and moved by the operating part, and a rod insertion groove formed in the first piston body so as to be open toward the other side of the housing part; and a second piston including a second piston body inserted into the other side of the housing part and moved by the operating part, and a bolt insertion groove formed in the second piston body so as to be open toward the opposite direction of a direction facing the first piston.

The piston part may further include: a first pressing rod coupled to the first piston and the brake shoe, and moved by the first piston so as to push the brake shoe; and a second pressing rod coupled to the second piston and the brake shoe, moved by the second piston so as to push the brake shoe.

The gap adjusting part may include: an adjusting bolt inserted into the bolt insertion groove, screwed to the inner circumferential surface of the bolt insertion groove so as to be moved in the opposite direction of a direction facing the first piston when rotated in one direction, and coupled to the second pressing rod; a saw-toothed part formed on the outer circumferential surface of the adjusting bolt; and an adjusting spring part having a locking part connected to the brake shoe and locked to the saw-toothed part, and configured to rotate the adjusting bolt to adjust a gap between the brake drum and the brake shoe.

The adjusting spring part may include: a first adjusting spring mounted on the brake shoe and having the locking part; and a second adjusting spring installed on the brake shoe and configured to provide an elastic force to the first adjusting spring.

The operating part may include: a worm shaft provided in the housing part, rotated by the motor part, and having a worm provided on the outer circumferential surface thereof; a worm wheel part inserted into the housing part, and engaged and rotated with the worm shaft; and an operating rod part installed through the worm wheel part, and configured to push the piston part while rotated with the rotation of the worm wheel part.

The worm wheel part may include: a worm wheel body; a rod through-hole formed in the worm wheel body such that the operating rod part is installed through the rod through-hole; and a worm wheel formed on the outer circumferential surface of the worm wheel body and engaged with the worm shaft.

The operating rod part may include: a rod center part fitted into the rod through-hole so as to be movable in the longitudinal direction of the operating rod part; a rod rotating part extended from one side of the rod center part, inserted into the rod insertion groove, and screwed to the inner circumferential surface of the rod insertion groove such that the first piston and the operating rod part are moved in the opposite directions when the operating rod part is rotated; and a rod pressing part extended from the other side of the rod center part, and configured to push the second piston body when the operating rod part is rotated.

The rod pressing part and the second piston body may be brought into point contact with the each other.

The rod center part may be spline-coupled to the inner circumferential surface of the rod through-hole.

In accordance with the embodiments of the present disclosure, the drum brake apparatus has an integrated structure in which the main braking part and the parking braking part are connected to each other in one housing. Thus, the main bake apparatus and the parking brake apparatus may be simultaneously installed through a simple process of installing the housing on the back plate.

Therefore, the present disclosure can simplify the manufacturing process further than the related art in which the main brake apparatus and the parking brake apparatus are separately manufactured and managed, and assembly locations capable of securing a gap in consideration of interference between the main brake apparatus and the parking brake apparatus are set, adjusted and designed to assemble the main brake apparatus and the parking brake apparatus, according to the specification. Furthermore, the gap between the main braking part and the parking braking part may be further decreased to reduce the size and weight of the drum brake apparatus, and the utilization of space may be further improved.

Furthermore, the gap adjusting part may be provided to perform an interaction with the operating piston part while sharing the installation space with the operating piston part, and thus included in the mechanism for parking, which includes the operating piston part. Thus, the present disclosure may improve the utilization of the space when the drum brake apparatus and an electronic parking brake apparatus included therein are designed, compared to the drum brake apparatus according to the related art in which the gap adjusting part and the operating piston part are separately disposed.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
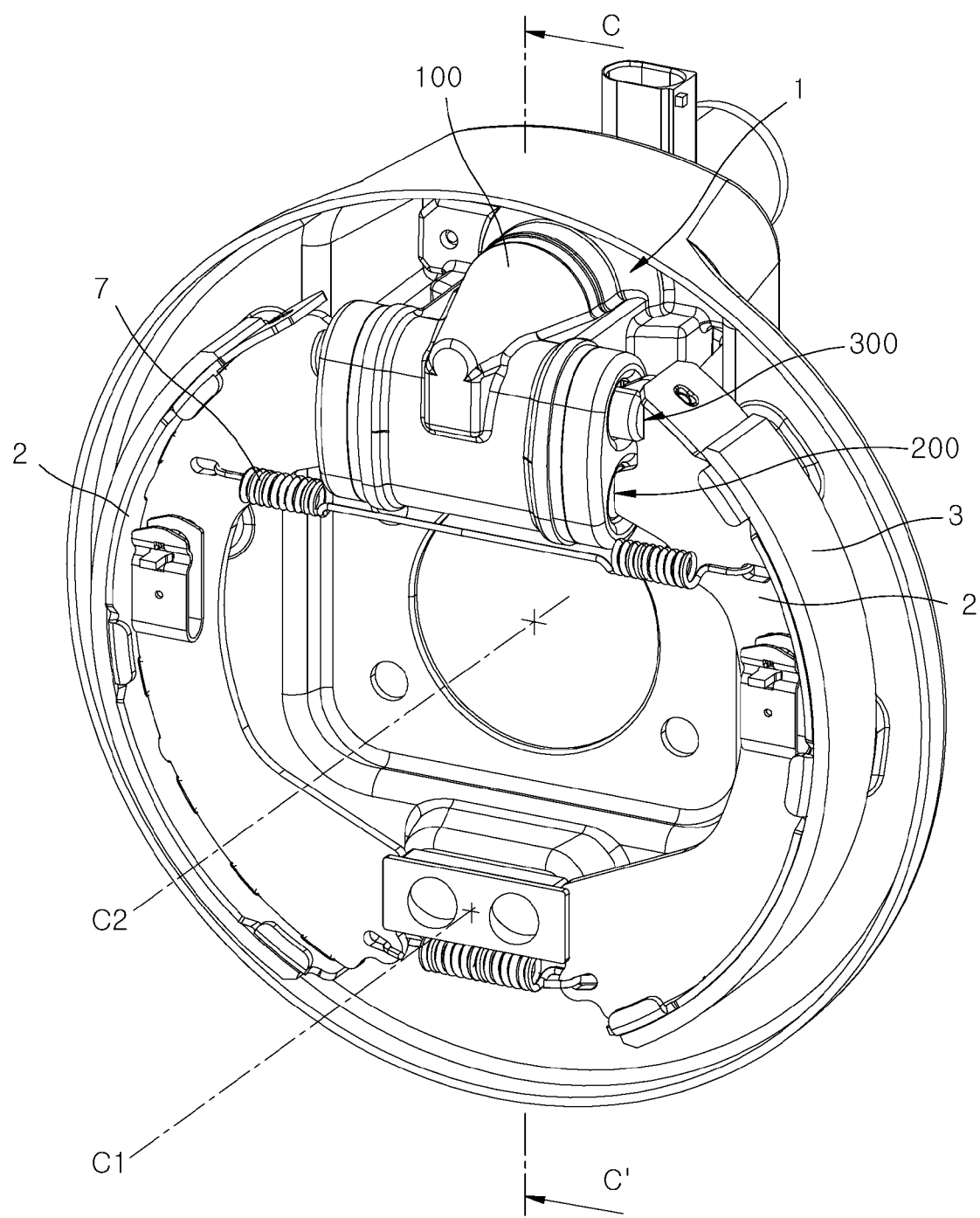
FIG. 1 is a front-side perspective view illustrating an installation state of a drum brake apparatus in accordance with an embodiment.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

Hereinafter, a drum brake apparatus will be described below with reference to the accompanying drawings through various exemplary embodiments. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 2:
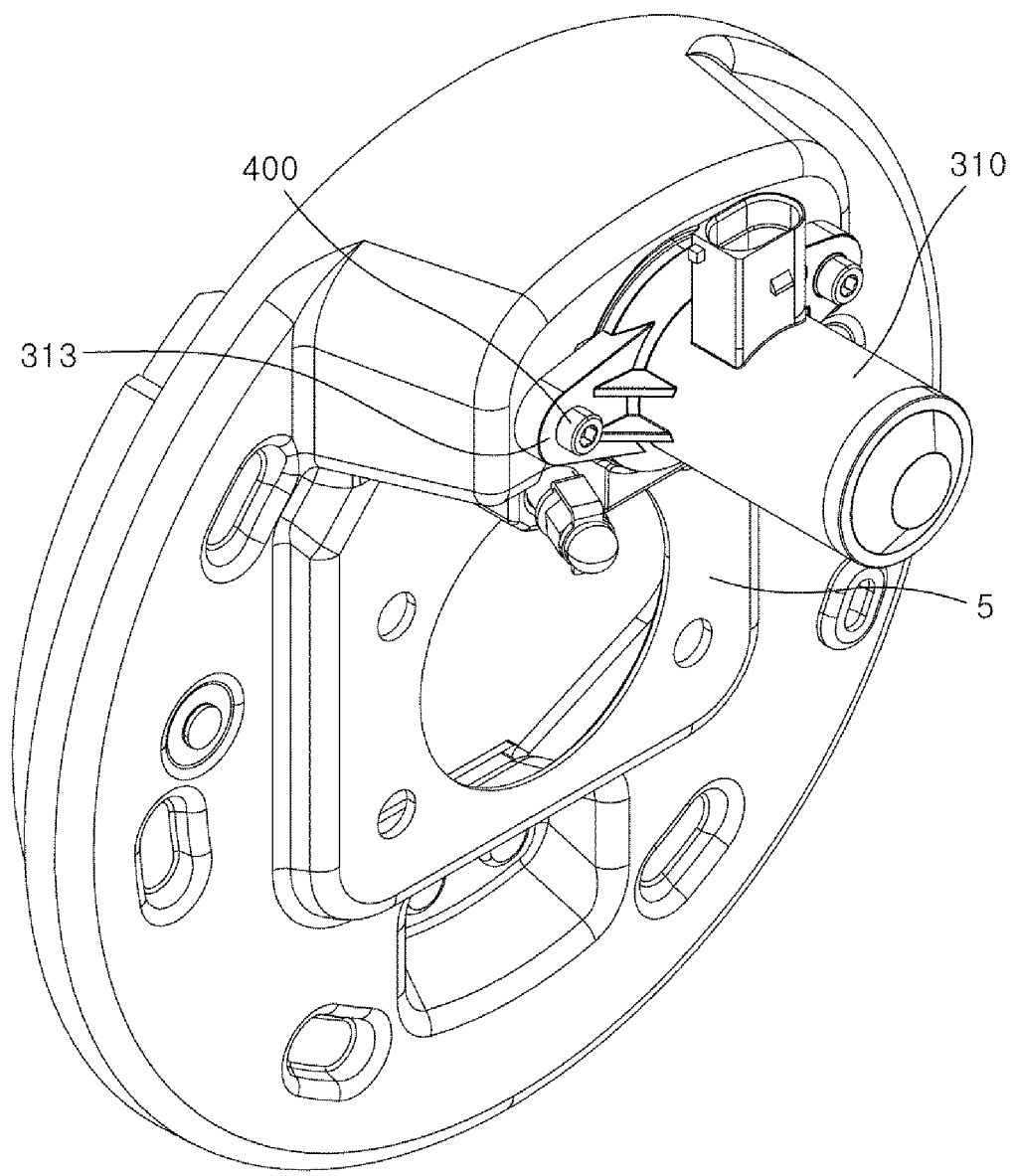
FIG. 2 is a rear-side perspective view illustrating the installation state of the drum brake apparatus in accordance with the embodiment.
Figure 3:
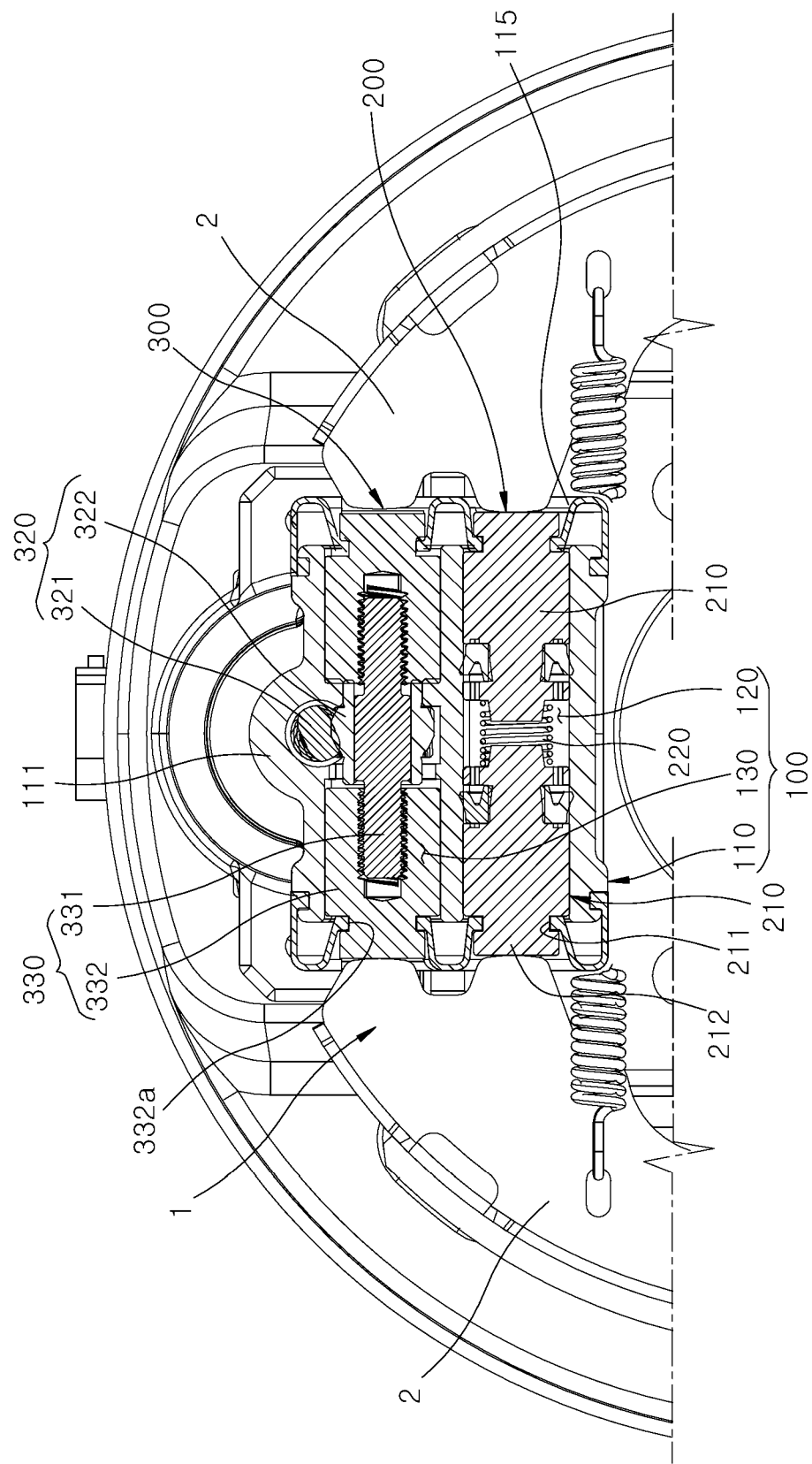
FIG. 3 is a cross-sectional view illustrating main parts of the drum brake apparatus in accordance with the embodiment.

FIG. 1 is a front-side perspective view illustrating an installation state of a drum brake apparatus in accordance with an embodiment, FIG. 2 is a rear-side perspective view illustrating the installation state of the drum brake apparatus in accordance with the embodiment, and FIG. 3 is a cross-sectional view illustrating main parts of the drum brake apparatus in accordance with the embodiment.

Referring to FIGS. 1 and 3, a drum brake apparatus 1 in accordance with an embodiment includes a housing 100, a main braking part 200 and a parking braking part 300.

The housing 100 is disposed between a pair of left and right shoes 2. The main braking part 200 is installed on one side of the housing 100, and driven by hydraulic pressure so as to press the shoes 2 during main braking. The parking braking part 300 is installed on the other side of the housing 100, and driven by an electromotive force so as to press the shoes 2 during parking braking. Both ends of the main braking part 200 are installed so as to be engaged with one sides of the shoes 2, and the parking braking part 300 is installed so as to be engaged with the other sides of the shoes 2 with a preset distance from the main braking part 200.

Referring to FIG. 3, the housing 100 in accordance with the embodiment includes a housing part 110, a piston housing part 120 and a rod housing part 130.

The housing part 110 constitutes the basic framework of the housing 100, and has the shape of one block. The piston housing part 120 in which the main braking part 200 is installed is formed on one side of the housing part 110 and has a hollow portion formed therein. The rod housing part 130 in which the parking braking part 300 is installed is formed on the other side of the housing part 110 with a predetermined distance from the piston housing part 120, and has a hollow portion formed therein.

Figure 4:
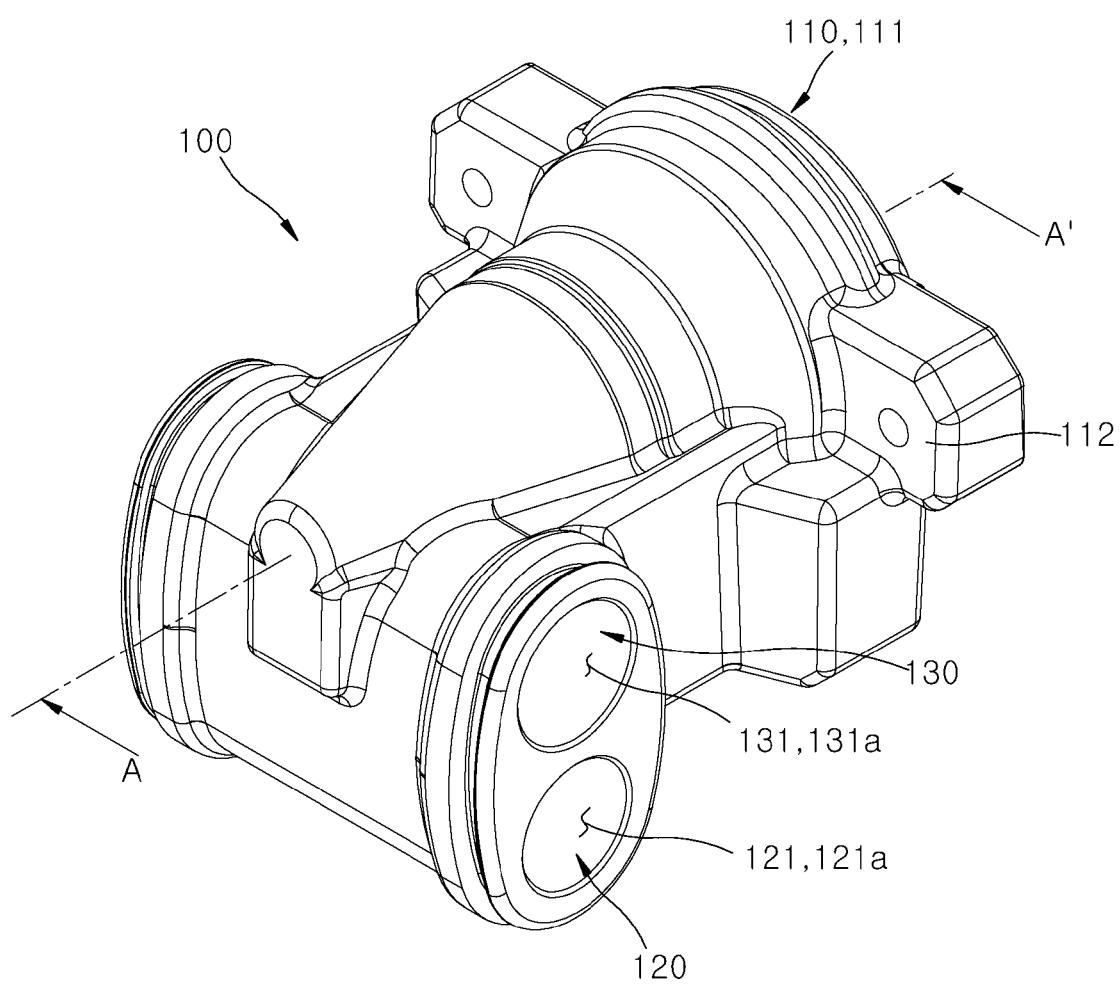
FIG. 4 is a front-side perspective view illustrating a main body part of the drum brake apparatus in accordance with the embodiment.
Figure 5:
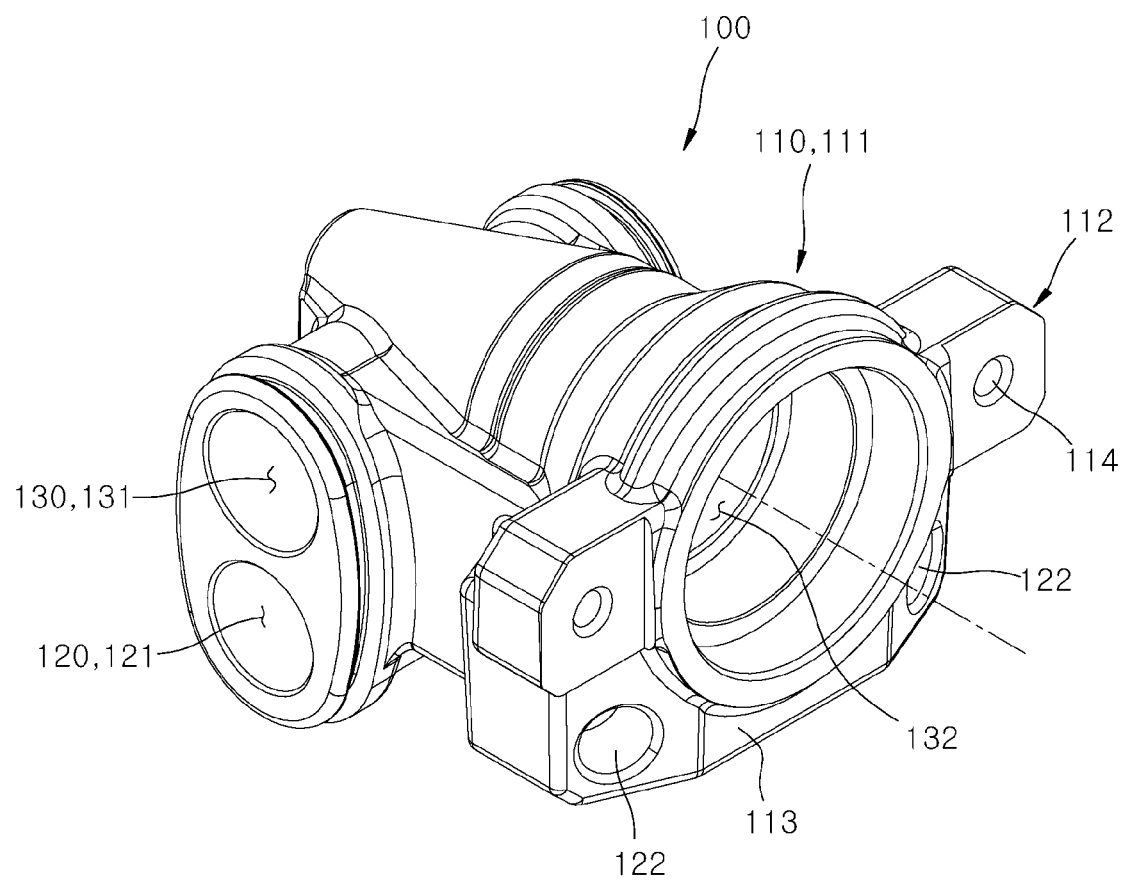
FIG. 5 is a rear-side perspective view illustrating the main body part of the drum brake apparatus in accordance with the embodiment.
Figure 6:
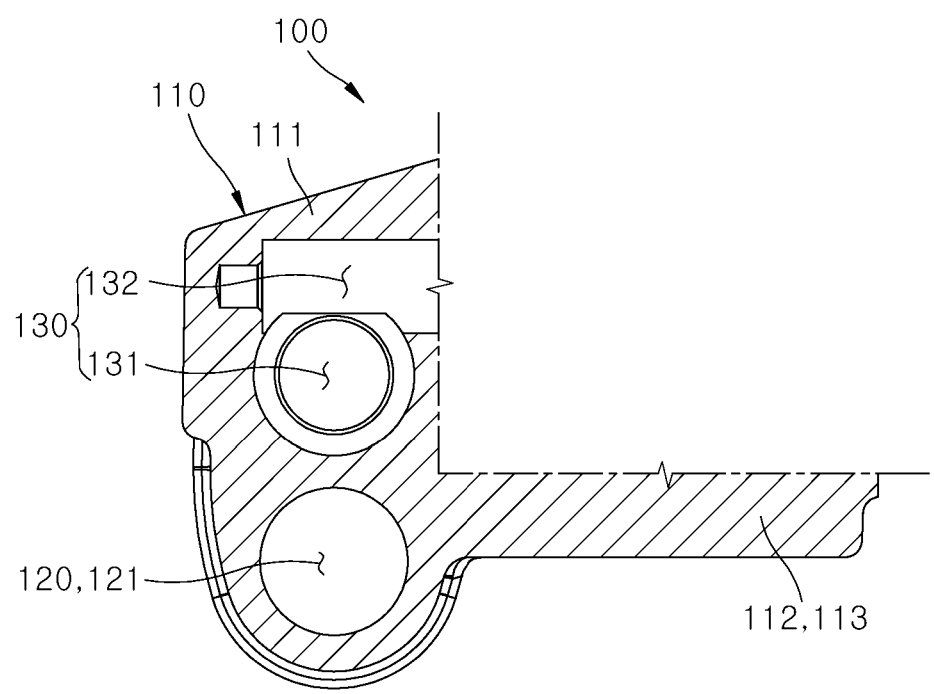
FIG. 6 is a cross-sectional view taken along the line A-A' of FIG. 4.

FIG. 4 is a front-side perspective view illustrating a main body part of the drum brake apparatus in accordance with the embodiment, FIG. 5 is a rear-side perspective view illustrating the main body part of the drum brake apparatus in accordance with the embodiment, and FIG. 6 is a cross-sectional view taken along the line A-A' of FIG. 4.

Referring to FIGS. 3 to 5, the housing part 110 in accordance with the embodiment includes a main body part 111, a fixing part 112 and a foreign matter introduction prevention part 115.

The main body part 111 is disposed to face an actuator 310, with a back plate 5 interposed therebetween. The piston housing part 120 and the rod housing part 130 are formed on the main body part 111 so as to be extended in a lateral direction, and have both open ends. The fixing part 112 is fixed to the back plate 5, and formed on the rear surface of the main body part 111, which abuts on the back plate 5. The fixing part 112 in accordance with the embodiment includes a fixing fastening part 114 and a movement prevention part 113.

The fixing fastening part 114 is fixed to the back plate 5 through a fastening member 400, and formed on either side of the main body part 111. The fixing fastening part 114 has a female screw to which the fastening member 400 such as a bolt may be screwed. Referring to FIG. 2, the fastening member 400 is sequentially passed through a fastening part 313, formed on either side of the actuator 310, and the back plate 5, and then fastened to the fixing fastening part 114, thereby fixing the main body part 111 and the actuator 310 to the back plate 5. As the fastening member 400 is fastened, the main body part 111 and the actuator 310 may be connected to each other and pressed against the front and rear surfaces of the back plate 5, respectively.

The movement prevention part 113 is formed to protrude from a location of the main body part 111, corresponding to the main braking part 200. The back plate 5 has a through-hole 6 for engagement with the movement prevention part 113 (see FIG. 10). For example, the through-hole 6 may have a horizontally extended rectangular shape, and the movement prevention part 113 may have a rectangular cross-sectional shape corresponding to the through-hole 6. The movement prevention part 113 is formed in a shape corresponding to the through-hole 6, and inserted into the through-hole 6 and fixed to the back plate 5 so as to stably constrain movement in a top-to-bottom direction and a side-to-side direction.

The movement of the main body part 111 in a front-to-rear direction, i.e. toward or from an output shaft of the actuator 310, is stably constrained by the fastening member 400 fastened to the fixing fastening part 114 through the back plate 5 at the rear of the actuator 310, and the movement of the main body part 111 in the radial direction of the actuator 310 is stably constrained by the movement prevention part 113 inserted into the through-hole 6 formed in the back plate 5.

Figure 7:
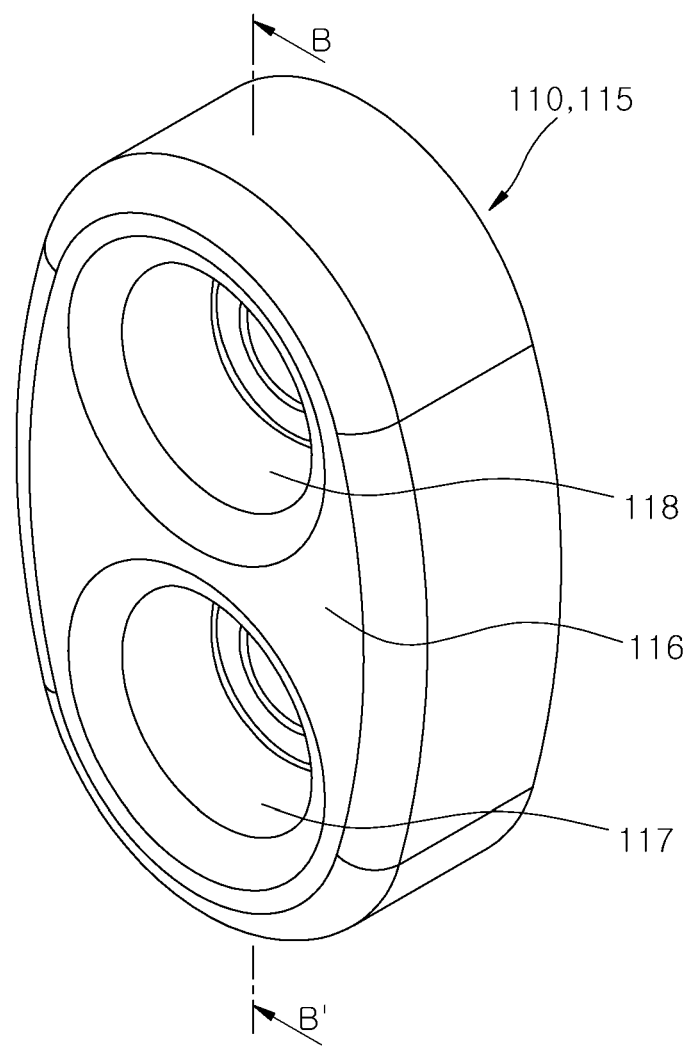
FIG. 7 is a perspective view illustrating a foreign matter introduction prevention part of the drum brake apparatus in accordance with the embodiment.
Figure 8:
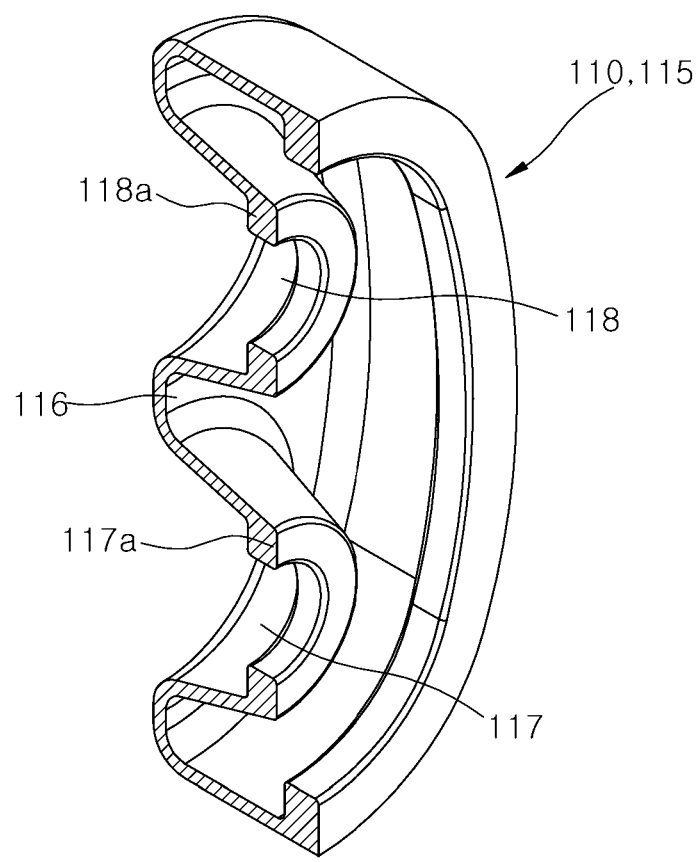
FIG. 8 is a cross-sectional view taken along the line B-B' of FIG. 7.

FIG. 7 is a perspective view illustrating the foreign matter introduction prevention part of the drum brake apparatus in accordance with the embodiment, and FIG. 8 is a cross-sectional view taken along the line B-B' of FIG. 7.

The foreign matter introduction prevention part 115 serves to prevent foreign matters from being introduced into the piston housing part 120 and the rod housing part 130, and is coupled to either side of the main body part 111, where an opening 121a of the piston housing part 120 and an opening 131a of the rod housing part 130 are positioned. The foreign matter introduction prevention part 115 is made of a soft or flexible material, and installed to cover the edge of the piston housing part 120 and the edge of the rod housing part 130.

Thus, the foreign matter introduction prevention part 115 serves to not only constrain the main braking part 200 from being separated to the outside of the piston housing part 120, but also constrain the parking braking part 300 from being separated to the outside of the rod housing part 130, without disrupting the operations of the main braking part 200 and the parking braking part 300. Referring to FIGS. 7 to 8, the foreign matter introduction prevention part 115 in accordance with the embodiment includes a connection part 116, a piston sealing part 117, a rod sealing part 118 and a main body fixing part (not illustrated).

The connection part 116 is disposed between the opening 131a of the rod housing part 130 and the opening 121a of the piston housing part 120, which are formed at a side surface of the main body part 111. The piston sealing part 117 has a shape corresponding to the edge of the piston housing part 120, and is formed successively with one side of the connection part 116. The rod sealing part 118 has a shape corresponding to the edge of the rod housing part 130, and is formed successively with the other side of the connection part 116.

When the piston housing part 120 is disposed under the rod housing part 130, the connection part 116 is disposed between the piston housing part 120 and the rod housing part 130, the piston sealing part 117 is disposed under the connection part 116 and formed as one body with the connection part 116, and the rod sealing part 118 is disposed above the connection part 116 and formed as one body with the connection part 116.

The opening 121a of the piston housing part 120 has a circular shape, and the piston sealing part 117 has a ring shape corresponding to the edge of the piston housing part 120. The edge of the piston housing part 120 protrudes from the main body part 111 by a preset thickness. Referring to FIG. 3, the outer circumference of the piston sealing part 117 covers the edge of the piston housing part 120, and is closely fixed to the housing part 110. An inner circumference 117a of the piston sealing part 117 is inserted into the main braking part 200, or more specifically a coupling groove 211 formed in a piston 210 of the main braking part 200, across the opening 121a of the piston housing part 120, and connected to the piston 210.

The opening 131a of the rod housing part 130 has a circular shape, and the rod sealing part 118 has a ring shape corresponding to the edge of the rod housing part 130. The edge of the rod housing part 130 protrudes from the main body part 111 by a preset thickness. Referring to FIG. 3, the outer circumference of the rod sealing part 118 is closely fixed to the housing part 110, while covering the edge of the rod housing part 130. An inner circumference 118a of the rod sealing part 118 is inserted into the parking braking part 300, or more specifically a groove 332a formed on the circumference of a push rod 332 of the parking braking part 300, across the opening 131a of the rod housing part 130, and connected to the push rod 332.

Fluid for creating a hydraulic pressure atmosphere may be introduced into the piston housing part 120, and lubricant for smooth operations of a gear part 320 and a rod part 330 may be introduced into the rod housing part 130. The piston sealing part 117 and the rod sealing part 118 may not only prevent the fluid within the piston housing part 120 and the rod housing part 130 from being lost to the outside through the opening 131a, but also prevent foreign matters from penetrating into the main braking part 200 and the parking braking part 300.

The main body fixing part (not illustrated) serves to reliably fix and connect the foreign matter introduction prevention part 115 to the main body part 111, and is formed on the connection part 116. The main body fixing part may have the structure of a hole through which a fastening member (not illustrated) such as a bolt can be passed. The connection part 116 is disposed between the piston sealing part 117 and the rod sealing part 118, and the main body fixing part is formed on the connection part 116. Therefore, the main body fixing part may be fixed to the main body part 111 through the fastening member, such that the piston sealing part 117 and the rod sealing part 118 can be reliably connected to the main body part 111.

Referring to FIGS. 4 to 6, the piston housing part 120 in accordance with the embodiment includes a cylinder part 121 and a hydraulic pressure flow path part 122.

The cylinder part 121 serves as the space for housing the main braking part 200, is formed in a circumferential shape on the housing part 110, and has a hollow portion formed therein. The cylinder part 121 is formed to cross the housing part 110 in the side-to-side direction, and has both open ends formed at side surfaces of the housing part 110. The hydraulic pressure flow path part 122 constitutes a supply path of fluid for creating a hydraulic pressure atmosphere in the cylinder part 121, and is extended from the outer surface of the housing part 110 to the cylinder part 121.

The hydraulic pressure flow path part 122 has an outer open end formed on the movement prevention part 113 provided on the rear surface of the main body part 111. Since the movement prevention part 113 is exposed to the rear of the back plate 5 through the through-hole 6, the hydraulic pressure flow path part 122 may stably supply fluid into the cylinder part 121 through the hydraulic pressure flow path part 122 from the rear side of the back plate 5 without interference with a plurality of parts including the pair of shoes 2 installed on the front side of the back plate 5.

An inner end of the hydraulic pressure flow path part 122 communicating with the cylinder part 121 is formed toward an elastic member 220 of the main braking part 200 installed in the cylinder part 121. The pair of left and right hydraulic pressure flow path parts 122 are disposed in a V-shape such that the distance therebetween gradually decreases from the outer ends toward the inner ends thereof. Therefore, the fluid introduced into the hydraulic pressure flow path part 122 flows toward the elastic member 220 disposed in the middle of the cylinder part 121.

According to such a structure of the hydraulic pressure flow path part 122, the fluid introduced into the cylinder part 121 may be uniformly distributed and diffused into the cylinder part 121 while interfering with the elastic member 220, which makes it possible to prevent the fluid from unequally and repeatedly applying shock to the inner wall of the cylinder part 121 or one side of the piston 210 while the fluid is introduced into the cylinder part 121.

Referring to FIGS. 4 to 6, the rod housing part 130 in accordance with the embodiment includes a rod cylinder part 131 and a driving shaft housing part 132.

The rod cylinder part 131 serves as a space for housing the rod part 330 of the parking braking part 300 and a driven gear 322 of the gear part 320, is formed in a circumferential shape on the housing part 110, and has a hollow portion formed therein. The rod cylinder part 131 is disposed in parallel to the cylinder part 121 while crossing the housing part 110 in the side-to-side direction, and has both open ends formed at side surfaces of the housing part 110.

The driving shaft housing part 132 serves as a space for housing a driving gear 321 of the gear part 320 of the parking braking part 300 and the output shaft of the actuator 310, and is formed to communicate with the rod cylinder part 131. The output shaft of the actuator 310 may be inserted into the housing part 110 through the driving shaft housing part 132, and connected to the gear part 320 of the parking braking part 300.

The driving shaft housing part 132 is disposed with a preset distance from the piston housing part 120. The distance between the driving shaft housing part 132 and the piston housing part 120 may be freely expanded and contracted in such a range that can prevent interference and communication therebetween. As the distance between the driving shaft housing part 132 and the piston housing part 120 is decreased, the volume and weight of the housing part 110 may be reduced. Such a structure can implement the size reduction which could not be realized by the drum brake apparatus according to the related art, in which the main brake apparatus and the parking brake apparatus are separately provided and the casing thickness of the main brake apparatus, the casing thickness of the parking brake apparatus and the gap between the main brake apparatus and the parking brake apparatus are all reflected.

Referring to FIGS. 1 and 3, the main braking part 200 in accordance with the embodiment includes the pair of pistons 210 and the elastic member 220.

The pair of pistons 210 press the shoes 2 toward a drum (not illustrated) or release the pressed shoes 2 while moved into/out of the cylinder part 121 along the cylinder part 121 by hydraulic pressure. In the embodiment, the pair of left and right pistons 210 are disposed at both ends of the cylinder part 121. An end portion of each of the pistons 210, exposed to the outside of the cylinder part 121, has the coupling groove 211 and a shoe coupling part 212 formed thereon.

The coupling groove 211 is formed in a circular shape along the outer circumference of the piston 210, and the inner circumference 117a of the piston sealing part 117 is fitted and coupled to the coupling groove 211. As the inner circumference 117a of the piston sealing part 117 is fitted and fixed to the coupling part 211, the cylinder part 121 is sealed. The shoe coupling part 212 is formed in a slit shape into which an end portion of the shoe 2 can be inserted, and engaged with the shoe 2.

When fluid is introduced through the hydraulic pressure flow path part 122, the internal pressure of the cylinder part 121 is increased. In this case, while the distance between the pair of left and right pistons 210 is increased, the pair of pistons 210 are expanded and moved to push out the pair of left and right shoes 2. Through such a process, main braking is performed. When the fluid is discharged through the hydraulic pressure flow path part 122, the internal pressure of the cylinder part 121 is decreased. In this case, while the distance between the pair of left and right pistons 210 is decreased, the pair of pistons 210 are contracted and moved to release the pair of pushed left and right shoes 2. Through such a process, the main braking is released.

The elastic member 220 is disposed in the cylinder part 121, and positioned between the pair of pistons 210. As the elastic member 220 is disposed between the pair of pistons 210, the elastic member 220 prevents the pair of pistons 210 from directly colliding with each other while the pair of pistons 210 return into the cylinder part 121, and reduces an impact force applied to the pistons 210. Furthermore, the elastic member 220 may interfere with the fluid introduced between the pair of pistons 210 through the hydraulic pressure flow path part 122, thereby uniformly distributing and diffusing the hydraulic pressure. As the elastic member 220, an elastic spring or the like may be applied.

Referring to FIGS. 1 and 3, the parking braking part 300 in accordance with the embodiment includes the actuator 310, the gear part 320 and the rod part 330.

The gear part 320 serves to receive a rotational driving force from the actuator 310 and transfer the rotational driving force to the rod part 330, has a worm wheel gear structure, and is disposed in the rod housing part 130. The driving gear 321 of the gear part 320 has a worm gear structure, is installed in the driving shaft housing part 132, and is coaxially connected to the output shaft of the actuator 310 inserted into the driving shaft housing part 132. The driven gear 322 of the gear part 320 has a wheel gear structure engaged with the worm gear, and disposed in the middle of the rod cylinder part 131.

The rod part 330 serves to convert a rotational displacement of the gear part 320 into a linear displacement, and transfer the linear displacement to the shoe 2. The rod part 330 includes a rotating rod 331 and the push rod 332, and is installed in the rod cylinder part 131. The rotating rod 331 is formed as one rod member, and coaxially connected to the driven gear 322. The push rod 332 includes a screw coupling part for coupling with the rotating rod 331 and is connected to an end of the rotating rod 331. While moved into/out of the rod cylinder part 131 in connection with the rotation and movement of the rotating rod 331, the push rod 332 presses the shoe 2 toward the drum or releases the pressed shoe 2.

In the present embodiment, the pair of left and right push rods 332 are disposed at both ends of the rod cylinder part 131. An end portion of the push rod 332, exposed to the outside of the rod cylinder part 131, has the same structure as the end portion of the piston 210 where the coupling groove 211 and the shoe coupling part 212 are formed. As the inner circumference 118a of the rod sealing part 118 is fitted and fixed to a groove formed on the outer circumference of the push rod 332, the rod cylinder part 131 is sealed by the rod sealing part 118. Furthermore, the end portion of the push rod 332 is formed in a slit shape into which the end portion of the shoe 2 can be inserted, and engaged with the shoe 2.

When the actuator 310 is driven in a forward direction, the rotational force of the actuator 310 is transferred to the rotating rod 331 through the gear part 320, and the rotating rod 331 is rotated in the forward direction while interworking with the gear part 320. At this time, while the distance between the pair of push rods 332 is increased along the rotating rod 331, the pair of push rods 332 are expanded and moved to push out the pair of left and right shoes 2. Through such a process, parking braking is performed. When the actuator 310 is driven in a backward direction, the pair of push rods 332 are contracted and moved to release the pair of pushed left and right shoes 2 while the distance between the pair of push rods 332 is decreased. Through such a process, the parking braking is released.

Figure 9A:
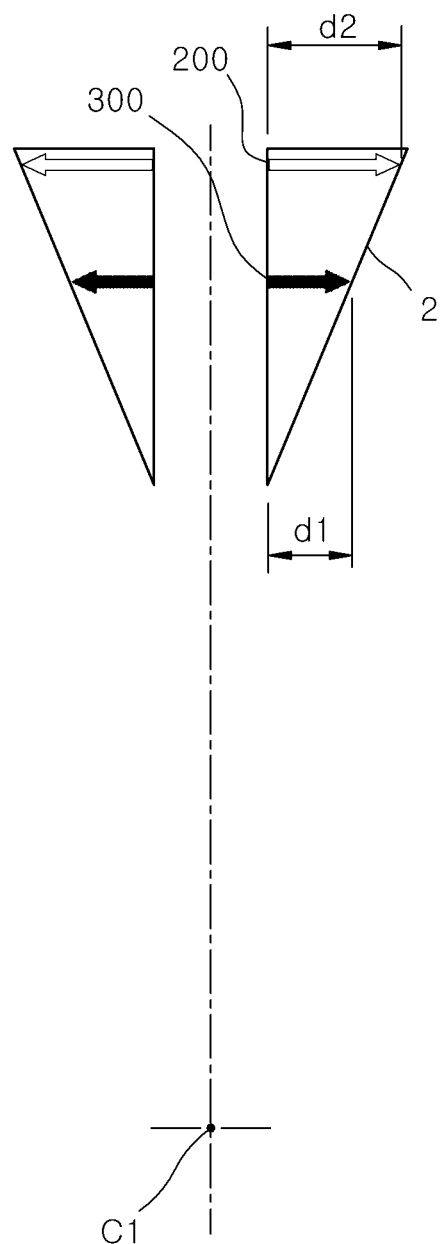
FIGS. 9A and 9B are conceptual views for describing tolerance depending on an arrangement of a main braking part and a parking braking part in the drum brake apparatus in accordance with the embodiment.
Figure 9B:
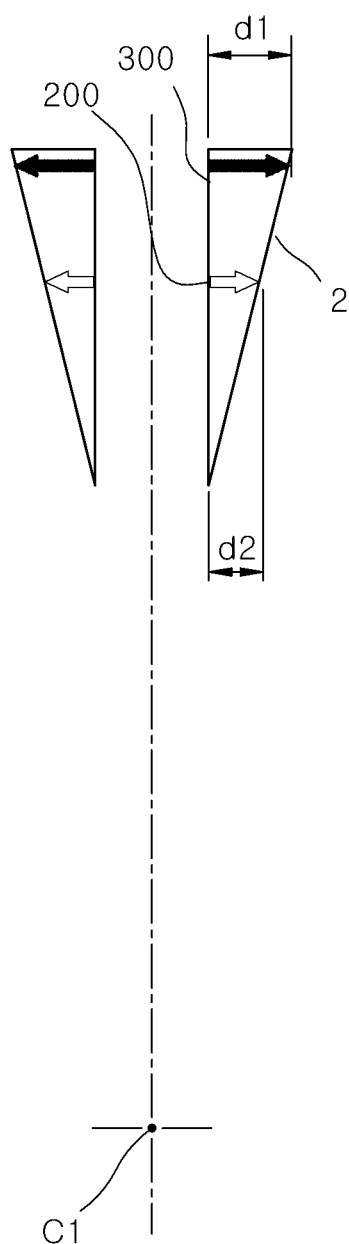
Figure 10:
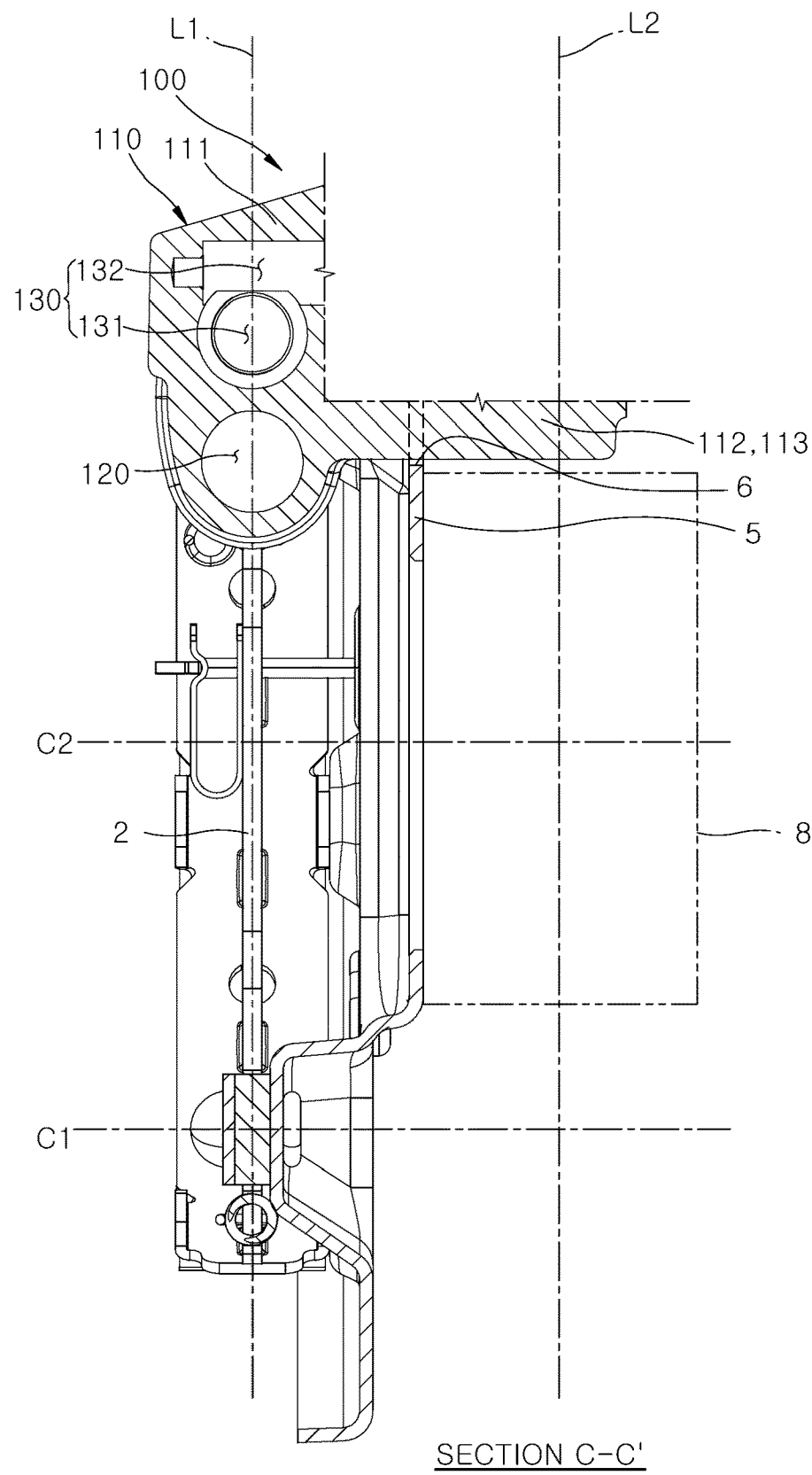
FIG. 10 is a cross-sectional view taken along the line C-C' of FIG. 1.

FIGS. 9A and 9B are conceptual views for describing tolerance depending on an arrangement of the main braking part and the parking braking part of the drum brake apparatus in accordance with the embodiment, and FIG. 10 is a cross-sectional view taken along the line C-C' of FIG. 1.

While a drum brake is used, a friction pad 3 attached to the shoe 2 is worn, and the gap between the shoe 2 and the drum (not illustrated) is varied by the wear of the friction pad 3. The gap between the shoe 2 and the drum may be calibrated by the parking braking part 300 so as to be constantly maintained even though the friction pad 3 is worn.

The length of the parking braking part 300 is flexibly varied depending on the driving state of the actuator 310, and the distance between the pair of shoes 2 may be substantially decided according to the length of the parking braking part 300 while the pair of shoes 2 are pressed by return spring 7 in directions approaching each other. The return spring 7 is shown in FIG. 1.

When the actuator 310 is driven in the forward direction, the parking braking part 300 performs parking braking while the length of the parking braking part 300 is increased to push out the pair of left and right shoes 2 in directions away from each other. When the actuator 310 is driven in the backward direction, the pressing force which has pushed out the shoes 2 is removed to release the parking braking. According to the driving amount of the actuator 310 in the backward direction, the gap between the shoe 2 and the drum may be adjusted and calibrated.

Referring to FIGS. 1 and 10, the rod housing part 130 is disposed at a location farther from the rotation center C1 of the shoe 2 than the piston housing part 120. This indicates that the parking braking part 300 installed in the rod housing part 130 is disposed at a location farther from the rotation center C1 of the shoe 2 than the main braking part 200 installed in the piston housing part 120.

When the main braking part 200 is disposed at a location farther from the rotation center C1 of the shoe 2 than the parking braking part 300, a tolerance d1 may occur while the return location of the shoe 2 or the gap between the shoe and the drum is adjusted and calibrated by the parking braking part 300. In this case, as illustrated in FIG. 9A, a tolerance d2 of the main braking part 200 is larger than the tolerance d1 of the parking braking part 300 (d2>d1).

In the present embodiment, when the rod housing part 130 is disposed at a location farther from the rotation center C1 of the shoe 2 than the piston housing part 120, the tolerance d2 of the main braking part 200 is smaller than the tolerance d1 of the parking braking part 300 as illustrated in FIG. 9B (d2<d1). Therefore, although the parking braking part 300 has the same tolerance d1 with respect to the shoe 2, the main braking part 200 has the smaller tolerance d2 than in an embodiment in which the main braking part 200 is disposed at a longer distance from the rotation center C1 of the shoe 2 than the parking braking part 300.

As the rod housing part 130 is disposed at a location farther from the rotation center C1 of the shoe 2 than the piston housing part 120, the tolerance d2 of the main braking part 200 may be clearly reduced with respect to the tolerance d1 of the parking braking part 300, which occurs as the same amount. Therefore, although the tolerance d2 occurs while the gap between the shoe 2 and the drum is calibrated by the parking braking part 300, the operation reliability of the main braking part 200 may be stably maintained.

Referring to FIG. 10, the piston housing part 120 and the rod housing part 130 of the housing 100 are disposed on one side (front side) of the back plate 5, and the actuator 310 is disposed on the other side (rear side) thereof. The central portion of the back plate 5 is supported by a chassis 8 of the vehicle body, and the chassis 8 is disposed on the other side of the actuator 310.

As the parking braking part 300 is disposed at a location farther from the rotation center C1 of the shoe 2 than the main braking part 200, the actuator 310 of the parking braking part 300 may be disposed farther from the rotation center C2 of the back plate 5. Thus, the actuator 310 does not need to be tilted in consideration of interference with the chassis 8, or a complex structure in which a stepped portion is formed at a location of the housing part 110, facing the chassis 8, does not need to be applied.

That is, when the actuator 310 is disposed on an extension line L2 in the same radial direction as the chassis 8 which supports the central portion of the back plate 5, the actuator 310 may not be tilted downward toward the front in order to minimize the interference with the chassis 8, but be disposed in parallel to the rotation center C2 of the back plate 5.

Therefore, the piston housing part 120 and the rod housing part 130 may be disposed on the same radial extension line L1 with respect to the rotation center C2 of the back plate 5, without difficulties in a design and manufacturing process for disposing the piston housing part 120 and the rod housing part 130 to have a relative angle therebetween by complexly considering the slope of the actuator 310 and the relative angle between the piston housing part 120 and the rod housing part 130. When the piston housing part 120 and the rod housing part 130 have a relative angle therebetween, it indicates that the piston housing part 120 and the rod housing part 130 are arranged in a direction perpendicular to the output shaft of the actuator 310. Therefore, the productivity and processability of the housing 100 may be further improved, which makes it possible to reduce the manufacturing cost.

Furthermore, as the parking braking part 300 is disposed at a location farther from the rotation center C1 of the shoe 2 than the main braking part 200, it is possible to stably avoid interference with the chassis 8 when the actuator 310 is disposed. Therefore, the thickness of the housing part 110, or more specifically the thickness of the rear bottom portion of the housing part 110 positioned between the actuator 310 and the chassis 8 may be increased to stably secure the stiffness of the housing part 110. In the present embodiment, the thickness of the rear bottom portion of the housing part 110 may indicate the thickness of the fixing part 112 or the movement prevention part 113 in the top-to-bottom direction.

The drum brake apparatus 1 in accordance with the embodiment, which has the above-described configuration, has an integrated structure in which the main braking part 200 and the parking braking part 300 are connected to each other in one housing 100. Thus, the main bake apparatus and the parking brake apparatus may be simultaneously installed through a simple process of installing the housing 100 on the back plate 5.

Therefore, the embodiment can simplify the manufacturing process further than the related art in which the main brake apparatus and the parking brake apparatus are separately manufactured and managed, and assembly locations capable of securing a gap in consideration of interference between the main brake apparatus and the parking brake apparatus are set, adjusted and designed to assemble the main brake apparatus and the parking brake apparatus, according to the specification. Furthermore, the gap between the main braking part 200 and the parking braking part 300 may be further decreased to reduce the size and weight of the drum brake apparatus, and the utilization of space may be further improved.

In general, an electronic drum brake is designed in such a manner that a parking part and a hydraulic piston serving as a main braking part are separated from each other. Furthermore, when hydraulic pressure is applied to the hydraulic piston during main braking, a shoe assembly presses a drum to decelerate the vehicle. When the actuator is operated to rotate a worm gear and a bolt screw while the hydraulic piston is pressed in case of vehicle parking, a parking piston presses the shoe assembly to additionally generate a parking force.

However, an electronic drum brake according to the related art has a 2-row structure in which the parking part and the hydraulic piston serving as the main braking part are separated from each other, and a wheel cylinder positioned between a hub bearing and a disk of a vehicle occupies the most of an internal space of the drum brake. In such a structure, the space in which an adjust part for compensating for lining wear is to be positioned is reduced. Therefore, there is a need for a device capable of solving the problem.

A drum brake apparatus 1100 in accordance with another embodiment is provided to solve the above-described problems, and includes a gap adjusting part 1700 in a mechanism for parking, in order to raise the utilization of space during design.

Figure 11:
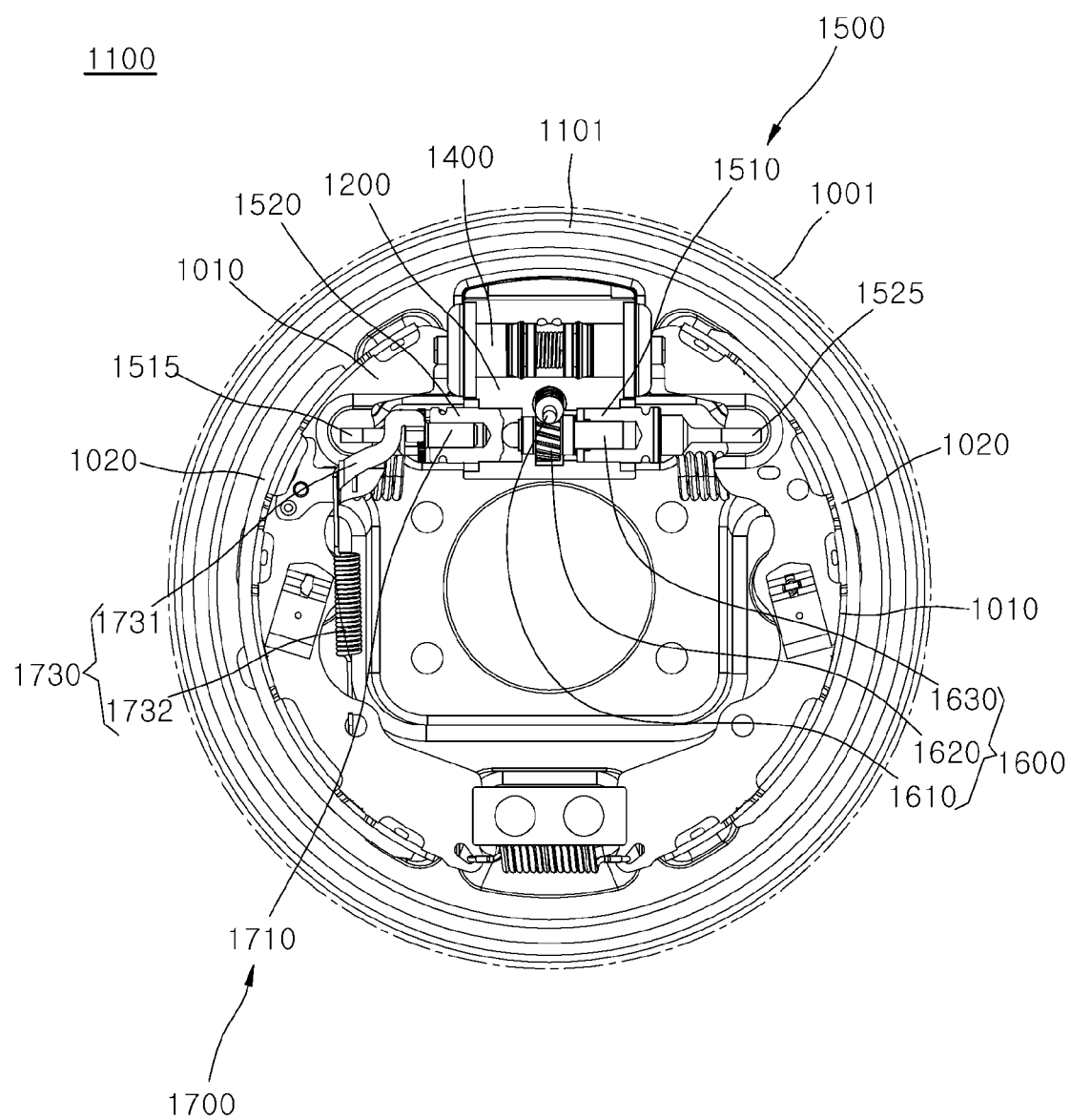
FIG. 11 is a front view schematically illustrating a drum brake apparatus in accordance with another embodiment.
Figure 12:
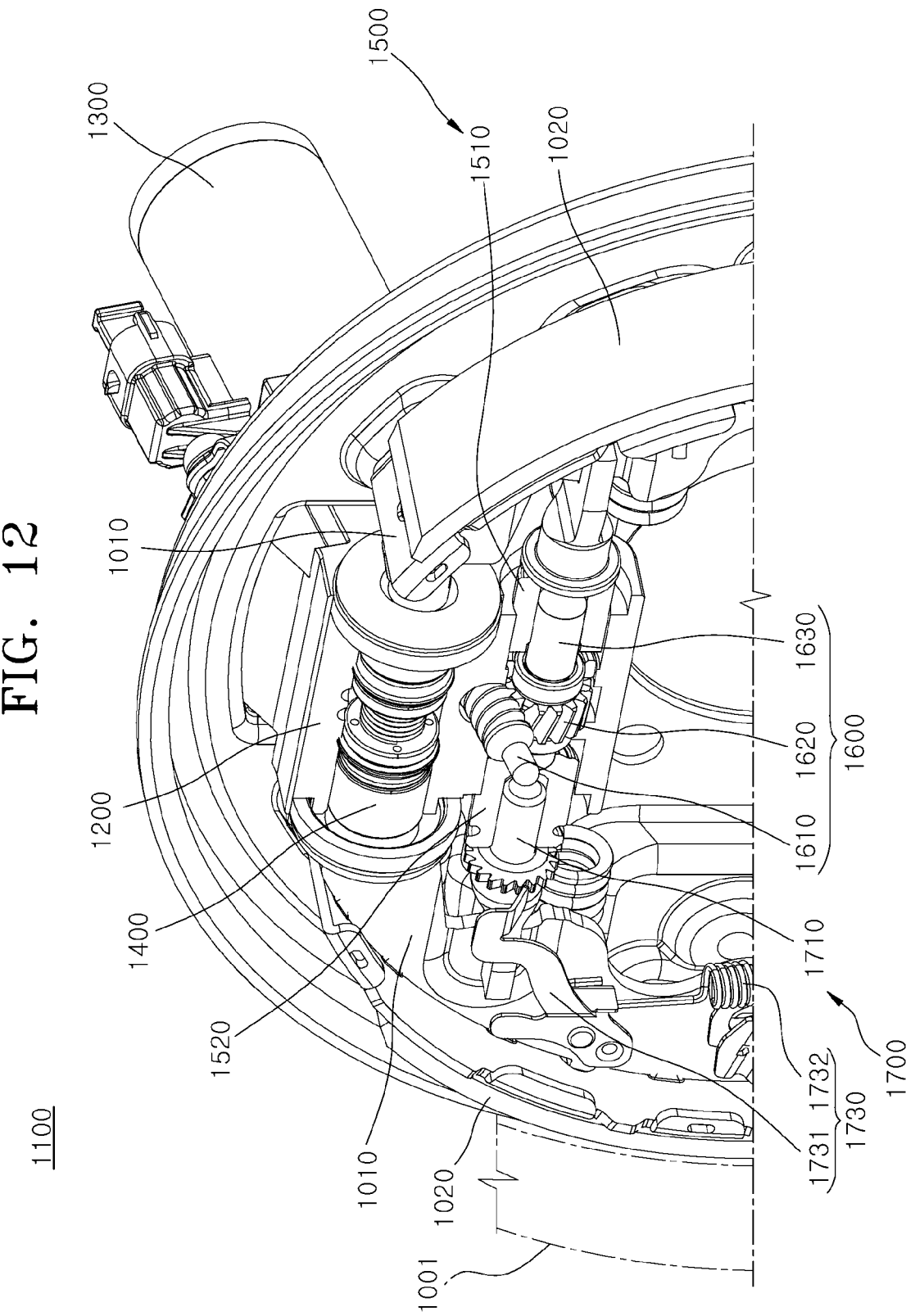
FIG. 12 is an expanded view illustrating a portion of the drum brake apparatus in accordance with the another embodiment.
Figure 13:
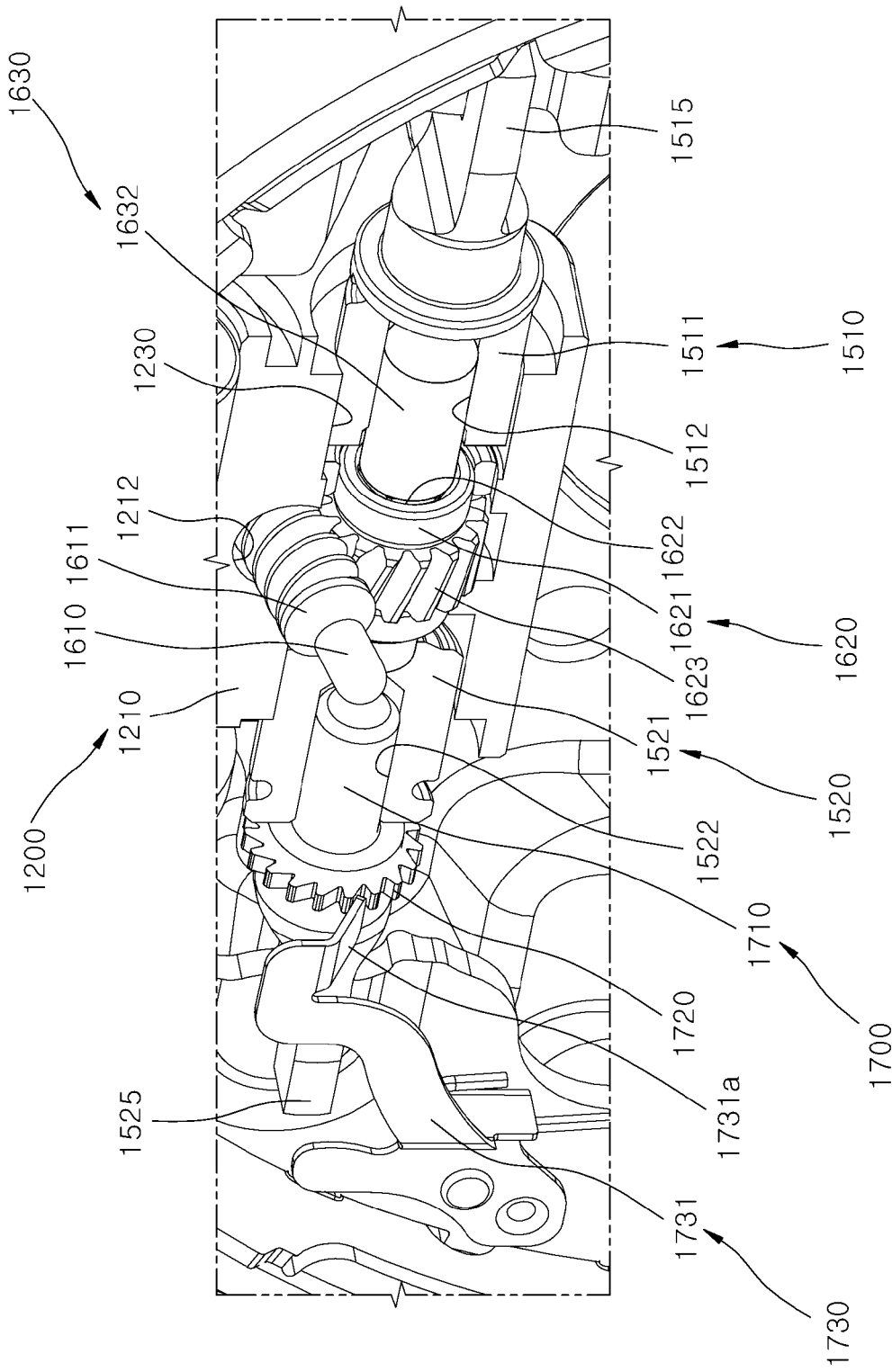
FIG. 13 is an expanded perspective view illustrating an operating part, an operating piston part and a gap adjusting part in FIG. 12.

Referring to FIGS. 11 to 13, the drum brake apparatus 1100 in accordance with the another embodiment may include a plate part 1101, a housing part 1200, a motor part 1300, an operating part 1600, an operating piston part 1500 and the gap adjusting part 1700. The motor part 1300, the operating part 1600, the operating piston part 1500 and the gap adjusting part 1700 perform the functions of an electronic parking brake apparatus which performs parking braking in the drum brake apparatus 1100 in accordance with the another embodiment.

The plate part 1101 has a pair of brake shoes 1010 rotatably mounted thereon, and each of the brake shoes 1010 has a lining 1020 installed on an outer surface thereof, the lining 1020 being contacted with a brake drum 1001. Specifically, the plate part 1101 may be mounted on a vehicle body, and the brake drum 1001 may be coupled to the plate part 1101. The pair of brake shoes 1010 may be mounted on the plate part 1101, and housed in an internal space of the brake drum 1001. The brake shoes 1010 may be disposed symmetrically with each other, and each have a lower end portion rotatably mounted on the plate part 1101. The brake shoe 1010 may have the lining 1020 attached to the outer surface thereof, the lining 1020 being contacted with the brake drum 1001. When the lining 1020 is worn depending on the use state of the vehicle, a gap occurs between the lining 1020 and the brake drum 1001.

The housing part 1200 is mounted on the plate part 1101. For example, the housing part 1200 may be bolted to the plate part 1101.

The motor part 1300 is mounted in the housing part 1200, and driven when power is applied thereto. For example, the motor part 1300 may be bolted to the housing part 1200, and a portion of the motor part 1300 may be embedded in the housing part 1200 and provide a rotational force to the operating part 1600, the operating piston part 1500 and the like.

The operating part 1600 is provided in the housing part 1200, and driven by the motor part 1300. For example, the operating part 1600 may be embedded in the housing part 1200, and connected to the motor part 1300 through the housing part 1200, thereby receiving the rotational force of the motor part 1300.

The operating piston part 1500 is provided in the housing part 1200 and includes a pair of pistons 510 and 520 which are moved by the operating part 1600 so as to operate the brake shoes 1010. For example, the pistons 510 and 520 of the operating piston part 1500 may be disposed on the left and right sides of the housing part 1200, respectively, and push upper end portions of the brake shoes 1010 toward the inner surface of the brake drum 1001, thereby generating a braking force.

Referring to FIGS. 11 and 12, the drum brake apparatus 1100 in accordance with the another embodiment may include a hydraulic piston part 1400 and the operating piston part 1500. That is, the hydraulic piston part 1400 and the operating piston part 1500 may be separately provided. For example, the hydraulic piston part 1400 and the operating piston part 1500 may be installed in the housing part 1200 in the top-to-bottom direction.

The hydraulic piston part 1400 may be mounted in the housing part 1200, and include a hydraulic piston 1410, a spring member 1420 and a push rod 1430. For example, the housing part 1200 may be connected to a flow path of the hydraulic brake apparatus (not illustrated), and hydraulic pressure for main braking may be supplied to the housing part 1200. The hydraulic piston 1410 may include a pair of hydraulic pistons which are separated from each other, and moved by hydraulic pressure guided through the housing part 1200. The push rod 1430 may be coupled to the hydraulic piston 1410 and the brake shoes 1010, and push the upper end portions of the brake shoes 1010 when the hydraulic piston 1410 is moved.

In the drum brake apparatus according to the related art, the hydraulic piston part 1400 for main braking and the operating piston part 1500 for providing an additional parking force are disposed in two rows so as to be separated from each other, thereby occupying the majority of the installation space. Therefore, the drum brake apparatus according to the related art may lack in the space for installing the gap adjusting part 1700 which serves to compensate for the wear of the lining 1020.

In order to solve such a problem, the gap adjusting part 1700 in accordance with the another embodiment may be included in the mechanism of the operating piston part 1500. Specifically, the gap adjusting part 1700 in accordance with the another embodiment is mounted on the operating piston part 1500, and adjusts the gap between the brake drum 1001 and the lining 1020 through an interaction with any one of the pair of pistons 510 and 520.

Between the brake drum 1001 and the lining 1020 attached to the brake shoe 1010, a large or small gap may occur to have an influence on the braking operation. When a large gap occurs, a problem such as delay of a braking operation may occur. When a small gap occurs, the wear of the lining 1020 may be accelerated. The gap adjusting part 1700 may adjust such a gap to be maintained within a proper range.

Furthermore, the gap adjusting part 1700 is mounted on the operating piston part 1500, and adjusts the gap between the brake drum 1001 and the lining 1020 through an interaction with any one of the pair of pistons 510 and 520. For example, the operating piston part 1500 may include a first piston 1510 and a second piston 1520, and the gap adjusting part 1700 may be mounted on the second piston 1520 and move the brake shoe 1010 through an interaction with the second piston 1520, thereby adjusting the gap between the lining 1020 and the brake drum 1001. At this time, the second piston 1520 may serve to not only push the brake shoe 1010, and but also adjust the gap, in order to perform parking braking.

The gap adjusting part 1700 in accordance with the another embodiment may be provided to perform an interaction with the operating piston part 1500 while sharing the installation space with the operating piston part 1500, and thus included in the mechanism for parking, which includes the operating piston part 1500. Thus, another embodiment may improve the utilization of the space when the drum brake apparatus 1100 and an electronic parking brake apparatus included therein are designed, compared to the drum brake apparatus according to the related art in which the gap adjusting part 1700 and the operating piston part 1500 are separately disposed.

Figure 14:
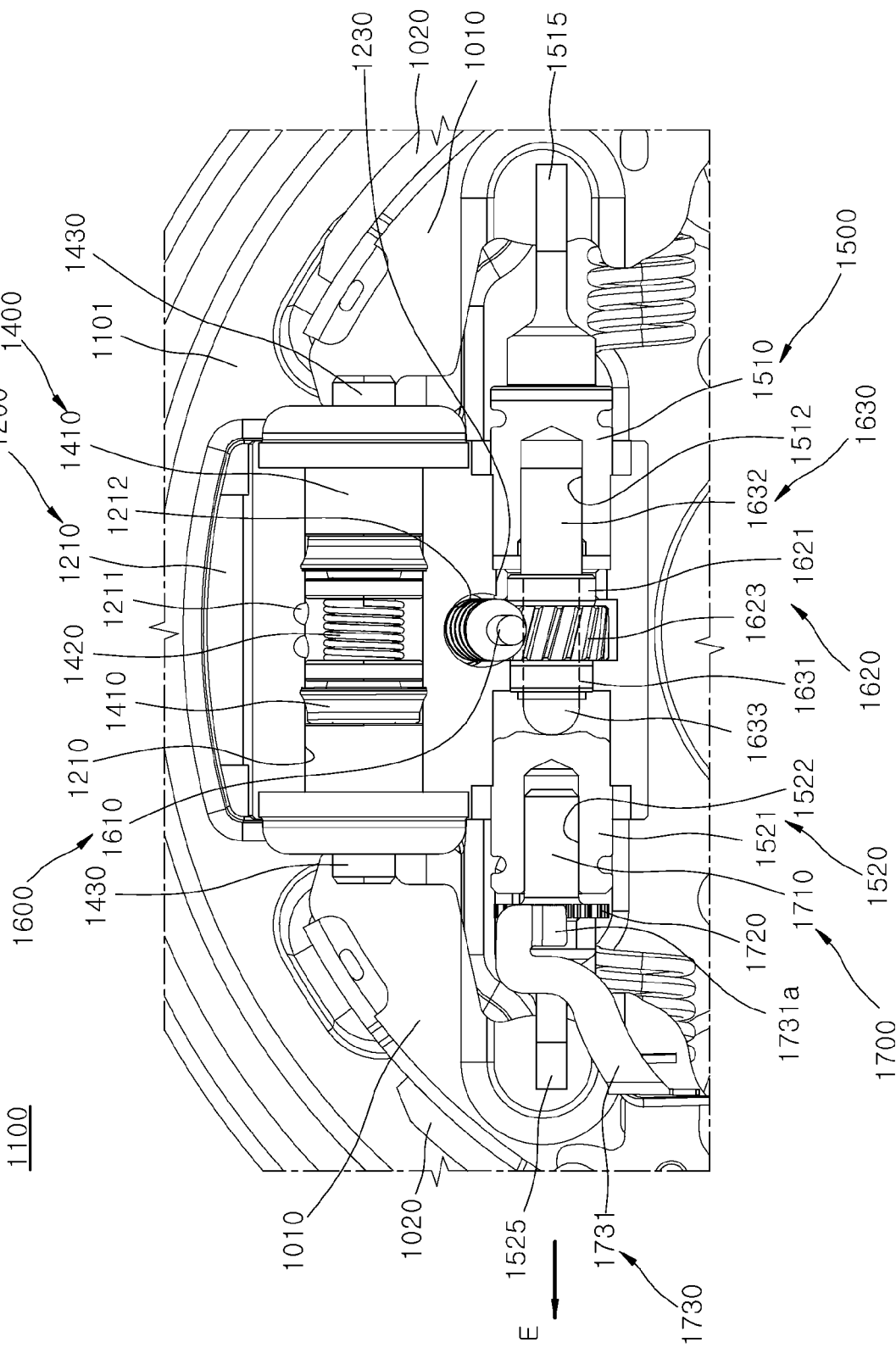
FIG. 14 is an expanded view illustrating that a gap is adjusted in the drum brake apparatus in accordance with the another embodiment.

Referring to FIGS. 11, 12 and 14, the housing part 1200 may include a body part 1210 and an operating piston mounting part 1230. The housing part 1200 may further include a hydraulic piston mounting part 1220.

The body part 1210 may have the motor part 1300 mounted therein. For example, the body part 1210 may be installed through the plate part 1101, and the motor part 1300 may be bolted to the rear surface of the body part 1210.

The operating piston mounting part 1230 may be formed in the body part 1210, and serve as the space in which the operating part 1600, the operating piston part 1500 and the gap adjusting part 1700 are mounted. That is, the gap adjusting part 1700 may be simultaneously mounted in the space where the operating piston part 1500 is mounted. The housing part 1200 may have an operation hole 1212 formed adjacent to the operating piston mounting part 1230.

The hydraulic piston mounting part 1220 may be formed in the body part 1210, and serve as the space in which the hydraulic piston part 1400 is mounted. The housing part 1200 may have a hydraulic pressure hole 1211 formed adjacent to the hydraulic piston mounting part 1220, and supply hydraulic pressure to the hydraulic piston part 1400 through the hydraulic pressure hole 1211.

Figure 15:
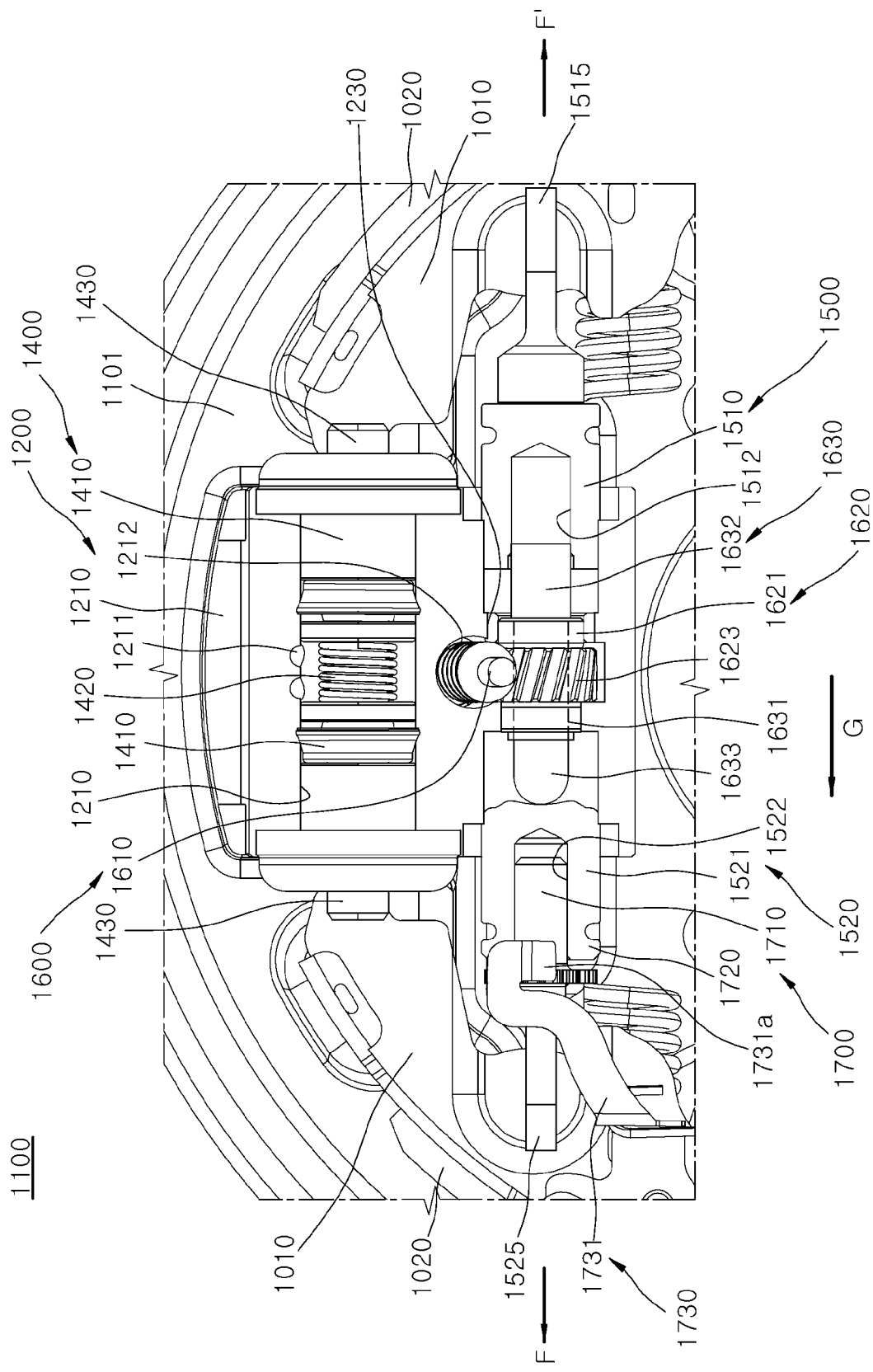
FIG. 15 is a diagram illustrating a parking state of the drum brake apparatus in accordance with the another embodiment.

Referring to FIGS. 13 to 15, the operating piston part 1500 may include the first piston 1510 and the second piston 1520.

The first piston 1510 may include a first piston body 1511 and a rod insertion groove 1512. The first piston body 1511 may be inserted into one side of the housing part 1200, and moved by the operating part 1600. The rod insertion groove 1512 may be formed in the first piston body 1511 so as to be open toward the other side of the housing part 1200.

The second piston 1520 may include a second piston body 1521 and a bolt insertion groove 1522. The second piston body 1521 may be inserted into the other side of the housing part 1200, and moved by the operating part 1600. The bolt insertion groove 1522 may be formed in the second piston body 1521 so as to be open toward the opposite direction of a direction facing the first piston 1510.

For example, as illustrated in the drawings, the first piston 1510 may be inserted into the right side of the operating piston mounting part 1230, and the rod insertion groove 1512 may be formed to be open toward the center of the operating piston mounting part 1230. The second piston 1520 may be inserted into the left side of the operating piston mounting part 1230, and the bolt insertion groove 1522 may be formed to be open toward the brake shoe 1010 from the second piston 1520.

The operating piston part 1500 may include a first pressing rod 1515 and a second pressing rod 1525.

The first pressing rod 1515 may be coupled to the first piston 1510 and the brake shoe 1010, and moved by the first piston 1510 so as to push the brake shoe 1010. The second pressing rod 1525 may be coupled to the second piston 1520 and the brake shoe 1010, and moved by the second piston 1520 so as to push the brake shoe 1010. The first and second pressing rods 1515 and 1525 may be moved in directions away from each other, and thus push the brake shoe 1010 to performing parking.

Referring to FIGS. 11 to 13, the gap adjusting part 1700 may include an adjusting bolt 1710, a saw-toothed part 1720 and an adjusting spring part 1730.

The adjusting bolt 1710 is inserted into the bolt insertion groove 1522, and screwed to the inner circumferential surface of the bolt insertion groove 1522 so as to move in the opposite direction of a direction facing the first piston 1510 when rotated in one direction. The adjusting bolt 1710 may be coupled to the second pressing rod 1525.

Specifically, the bolt insertion groove 1522 may have a screw threshold formed on the inner surface thereof, and the adjusting bolt 1710 may have a screw thread formed on the outer surface thereof so as to correspond to the screw threshold of the bolt insertion groove 1522. Therefore, while the adjusting bolt 1710 is rotated by such a structure, the adjusting bolt 1710 may be linearly moved in the axial direction through the screw coupling. For example, when rotated in one direction, the adjusting bolt 1710 may be moved in a direction away from the first piston 1510. At this time, the second pressing rod 1525 coupled to the adjusting bolt 1710 may be moved to push the brake shoe 1010, thereby adjusting the gap between the lining 1020 and the brake drum 1001.

The saw-toothed part 1720 is formed on the outer circumferential surface of the adjusting bolt 1710. For example, the saw-toothed part 1720 may be formed along the edge of the outer circumferential surface so as to protrude from the outer circumferential surface of the adjusting bolt 1710.

The adjusting spring part 1730 may include a locking part connected to the brake shoe 1010 and locked to the saw-toothed part 1720, and rotate the adjusting bolt 1710 so as to adjust the gap between the brake drum 1001 and the brake shoe 1010.

Specifically, the adjusting spring part 1730 may include a first adjusting spring 1731 and a second adjusting spring 1732. The first adjusting spring 1731 may be mounted on the brake shoe 1010, and include a locking part. The second adjusting spring 1732 may be installed on the brake shoe 1010, and provide an elastic force to the first adjusting spring 1731.

For example, the first adjusting spring 1731 may be rotatably installed on the brake shoe 1010, and the locking part formed at one end thereof may be locked to the saw-toothed part 1720 or separated from the saw-toothed part 1720. For example, the first adjusting spring 1731 may be a plate spring, but is not limited thereto. The second adjusting spring 1732 may have one end fixed to the brake shoe 1010 and the other end fixed to the first adjusting spring 1731, and thus provide an elastic force to the first adjusting spring 1731. The second adjusting spring 1732 may be a coil spring, but is not limited thereto.

When a gap between the brake drum 1001 and the lining 1020 exceeds a predetermined range, the adjusting bolt 1710 may be linearly moved while rotated by the adjusting spring part 1730. Thus, the gap between the brake drum 1001 and the lining 1020 may be adjusted and maintained within the predetermined range.

Referring to FIGS. 13 to 15, the operating part 1600 may include a worm shaft 1610, a worm wheel part 1620 and an operating rod part 1630.

The worm shaft 1610 may be installed in the housing part 1200 and rotated by the motor part 1300, and have a worm 1611 formed on the outer circumferential surface thereof. The worm shaft 1610 may be formed as one body with a motor shaft included in the motor part 1300, or coupled to the motor shaft.

The worm wheel part 1620 may be inserted into the housing part 1200, and engaged and rotated with the worm shaft 1610. The worm wheel part 1620 may be inserted into the housing part 1200, and engaged with the worm shaft 1610 installed through the housing part 1200 so as to receive a driving force of the motor part 1300.

The operating rod part 1630 may be installed through the worm wheel part 1620, and push the operating piston part 1500 while rotated with the rotation of the worm wheel part 1620.

Specifically, the worm wheel part 1620 may include a worm wheel body 1621, a rod through-hole 1622 and a worm wheel 1623.

The worm wheel body 1621 may be installed in the center of the operating piston mounting part 1230. The rod through-hole 1622 may be formed in the worm wheel body 1621, and the operating rod part 1630 may be installed through the rod through-hole 1622. The worm wheel 1623 may be formed on the outer circumferential surface of the worm wheel body 1621, and engaged with the worm shaft 1610. Specifically, the worm wheel body 1621 may be formed in a pipe shape such that the rod through-hole 1622 is formed through the operating piston mounting part 1230 in the longitudinal direction thereof. The worm wheel 1623 formed on the outer circumferential surface of the worm wheel body 1621 may be engaged with the worm 1611 of the worm shaft 1610. When the worm wheel body 1621 is rotated, the operating rod part 1630 installed through the rod through-hole 1622 may be rotated together.

The operating rod part 1630 may include a rod center part 1631, a rod rotating part 1632 and a rod pressing part 1633.

The rod center part 1631 may be fitted into the rod through-hole 1622 so as to move in the longitudinal direction of the operating rod part 1630. Specifically, the rod center part 1631 may be spline-coupled to the inner circumferential surface of the rod through-hole 1622. For example, the rod center part 1631 may have a polygonal cross-section, and the rod through-hole 1622 may be formed in a shape corresponding to the polygonal cross-section. Thus, the rod center part 1631 may be rotated with the rotation of the worm wheel part 1620, and moved in the longitudinal direction of the operating rod part 1630.

The rod rotating part 1632 may be extended from one side of the rod center part 1631, and inserted into the rod insertion groove 1512. The rod rotating part 1632 may be screwed to the inner circumferential surface of the rod insertion groove 1512 such that the first piston 1510 and the operating rod part 1630 are moved in the opposite directions when the operating rod part 1630 is rotated. The rod pressing part 1633 may be extended from the other side of the rod center part 1631, and push the second piston body 1521 when the operating rod part 1630 is rotated. Specifically, when the worm wheel part 1620 is rotated, the rod rotating part 1632 and the rod insertion groove 1512 may be screwed to each other while the rod center part 1631 is rotated with the worm wheel part 1620. Through such screw coupling, the operating rod part 1630 and the first piston 1510 may be linearly moved in the opposite directions. Therefore, the rod pressing part 1633 may push the second piston body 1521. The rod pressing part 1633 may be brought into point contact with the second piston body 1521. For example, a leading end of the rod pressing part 1633, facing the second piston body 1521, may be formed in a spherical shape, such that the rod pressing part 1633 and the second piston body 1521 are brought into point contact with each other. Therefore, when the rod pressing part 1633 is rotated to press the second piston body 1521, the frictional force between the rod pressing part 1633 and the second piston body 1521 may be reduced.

However, the shape of the rod pressing part 1633 is not limited thereto, but the rod pressing part 1633 may be modified in various shapes as long as the rod pressing part 1633 and the second piston body 1521 can be brought into point contact with each other. For example, the shape of the portion of the second piston body 1521, which is contacted with the rod pressing part 1633, may be modified.

FIG. 14 is a diagram illustrating a gap adjusting operation of the drum brake apparatus 1100 in accordance with the another embodiment. Referring to FIG. 14, when a gap occurs between the brake drum 1001 and the lining 1020, the locking part of the adjusting spring part 1730 may rotate the saw-toothed part 1720, thereby rotating the adjusting bolt 1710. As the adjusting bolt 1710 and the bolt insertion groove 1522 are screw-coupled to each other when the adjusting bolt 1710 is rotated, the adjusting bolt 1710 protrudes from the second piston 1520 while moved in a direction away from the first piston 1510 (see direction E of FIG. 14). At this time, the second pressing rod 1525 coupled to the adjusting bolt 1710 may be moved to push the brake shoe 1010, thereby adjusting the gap between the lining 1020 and the brake drum 1001.

FIG. 15 is a diagram illustrating a parking operation of the drum brake apparatus 1100 in accordance with the another embodiment. Referring to FIG. 15, when power is applied to the motor part 1300 during parking, the worm shaft 1610 is rotated, and the worm wheel part 1620 engaged with the worm shaft 1610 is rotated. When the worm wheel part 1620 is rotated, the rod center part 1631 spline-coupled to the worm wheel body 1621 is rotated. When the rod center part 1631 is rotated in one direction, the rod rotating part 1632 screwed to the rod insertion groove 1512 of the first piston 1510 is rotated to move the first piston 1510 to the right (see direction F' of FIG. 15). At this time, since the operating rod part 1630 is moved to the left (see direction G of FIG. 15), the rod pressing part 1633 moves the second piston 1520 to the left (see direction F of FIG. 15). Therefore, while the first and second pistons 1510 and 1520 are moved in directions away from each other (see directions F and F') at the same time, the pair of brake shoes 1010 may be operated at the same time to perform braking for parking.

In the drum brake apparatus 1100 in accordance with the another embodiment, the gap adjusting part 1700 may be provided to perform an interaction with the operating piston part 1500 while sharing the installation space with the operating piston part 1500, and thus included in the mechanism for parking, which includes the operating piston part 1500. Thus, the another embodiment may improve the utilization of the space when the drum brake apparatus 1100 and an electronic parking brake apparatus included therein are designed, compared to the drum brake apparatus according to the related art in which the gap adjusting part 1700 and the operating piston part 1500 are separately disposed.

Although exemplary embodiments have been disclosed for illustrative purposes, those skilled in the art will appreciate that various modifications, additions and substitutions are possible, without departing from the scope of the embodiments as defined in the accompanying claims. Thus, the true technical scope of the disclosure should be defined by the following claims.

What is claimed is:

1. A drum brake apparatus comprising:
   a housing;
   a main braking part installed on one side of the housing, and driven by hydraulic pressure so as to press a shoe during main braking; and
   a parking braking part installed on an other side of the housing, and driven by an electromotive force of an actuator so as to press the shoe during parking braking,
   wherein the housing comprises:
      a housing part;
      a piston housing part formed on the housing part, the piston housing part having a hollow portion formed therein and having the main braking part installed therein; and
      a rod housing part formed on the housing part, the rod housing part having a hollow portion formed therein, having the parking braking part installed therein, and disposed at a location farther from a rotation center of the shoe than the piston housing part,
   wherein the housing part comprises:
      a main body part in which the piston housing part and the rod housing part are formed;
      a fixing part formed on the main body part and fixed to a back plate; and
      a foreign matter introduction prevention part coupled to a side portion of the main body part where an opening of the piston housing part and an opening of the rod housing part are positioned, and configured to cover the edge of the piston housing part and the edge of the rod housing part.

2. The drum brake apparatus of claim 1, wherein the fixing part comprises:
   one or more fixing fastening parts formed on both sides of the main body part, and fixed to the back plate with the actuator by a fastening member; and
   a movement prevention part protruding from a location where the main braking part is disposed, and fitted into a through-hole formed in the back plate.

3. The drum brake apparatus of claim 1, wherein the foreign matter introduction prevention part comprises:
   a connection part disposed between the opening of the piston housing part and the opening of the rod housing part;
   a piston sealing part having a ring shape corresponding to the edge of the piston housing part, formed contiguously with one side of the connection part, and having an inner end connected to the main braking part; and
   a rod sealing part having a ring shape corresponding to the edge of the rod housing part, formed contiguously with the other side of the connection part, and having an inner end connected to the parking braking part.

4. The drum brake apparatus of claim 1, wherein the piston housing part comprises:
   a cylinder part formed in a circumferential shape on the housing part, having a hollow portion formed therein, and having the main braking part housed therein; and
   a hydraulic pressure flow path part extended from the outer surface of the housing part to the cylinder part, and configured to form a flow path for supplying fluid into the cylinder part.

5. The drum brake apparatus of claim 1, wherein the rod housing part comprises:
   a rod cylinder part formed in a circumferential shape on the housing part, having a hollow portion formed therein, and having the parking braking part housed therein; and
   a driving shaft housing part disposed at a preset distance from the piston housing part, formed to communicate with the rod cylinder part, and connected to the parking braking part through an output shaft of the actuator, which is insertable into the driving shaft housing part.

6. The drum brake apparatus of claim 1, wherein the main braking part comprises:
   one or more pistons disposed at an end of the housing, and configured to press the shoe in response to the one or more pistons being moved in a direction towards an exterior of the housing by hydraulic pressure; and
   an elastic member disposed in the housing, and configured to reduce an impact force applied to the one or more pistons when the one or more pistons move in a direction towards an interior of the housing.

7. The drum brake apparatus of claim 1, wherein the parking braking part comprises:
   a gear part disposed in the housing, and rotated in connection with the actuator; and
   a rod part connected to the gear part, and configured to, in connection with the gear part, press the shoe in response to the rod part being moved in a direction towards an exterior of the housing.

8. The drum brake apparatus of claim 1, wherein:
   the piston housing part and the rod housing part are positioned on a same radial extension line with respect to a rotation center of the back plate; and
   the actuator is positioned on a same radial extension line as a chassis which supports the central portion of the back plate, and disposed in parallel to the rotation center of the back plate.

* * * * *